: US008933151B2

United States Patent
Masanaga et al.

(10) Patent No.: US 8,933,151 B2
(45) Date of Patent: Jan. 13, 2015

(54) SHRINKAGE-REDUCING AGENT FOR HYDRAULIC MATERIAL

(75) Inventors: Mari Masanaga, Suita (JP); Koji Fukuhara, Suita (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 13/520,986

(22) PCT Filed: Jan. 7, 2011

(86) PCT No.: PCT/JP2011/050164
§ 371 (c)(1),
(2), (4) Date: Jul. 6, 2012

(87) PCT Pub. No.: WO2011/083839
PCT Pub. Date: Jul. 14, 2011

(65) Prior Publication Data
US 2012/0289630 A1    Nov. 15, 2012

(30) Foreign Application Priority Data

Jan. 8, 2010  (JP) ................. 2010-002758
Jan. 29, 2010  (JP) ................. 2010-017861
Mar. 29, 2010  (JP) ................. 2010-074245

(51) Int. Cl.
*C07C 43/10*    (2006.01)
*C08L 97/00*    (2006.01)
(52) U.S. Cl.
USPC .............. 524/73; 524/158; 524/161; 524/4
(58) Field of Classification Search
USPC .................. 524/73, 4, 158, 161
See application file for complete search history.

(56) References Cited

U.S. PATENT DOCUMENTS

| 4,975,121 | A | 12/1990 | Sakuta et al. |
| 5,174,820 | A | 12/1992 | Sakuta et al. |
| 5,181,961 | A | 1/1993 | Umaki et al. |
| 5,556,460 | A | 9/1996 | Berke et al. |
| 2002/0042458 | A1* | 4/2002 | Kinoshita et al. ............... 524/3 |
| 2011/0291053 | A1 | 12/2011 | Masanaga |

FOREIGN PATENT DOCUMENTS

| CN | 1233234 A | 10/1999 |
| JP | 56-51148 B2 | 12/1981 |
| JP | 59-152253 A | 8/1984 |
| JP | 01-53214 B2 | 11/1989 |
| JP | 01-53215 B2 | 11/1989 |
| JP | 6-006500 B | 1/1994 |

(Continued)

OTHER PUBLICATIONS

Machine translation of WO 2008117372. Feb. 2008.*

(Continued)

*Primary Examiner* — John Uselding
(74) *Attorney, Agent, or Firm* — Sughrue Mion, PLLC

(57) ABSTRACT

Provided is a shrinkage-reducing agent for a hydraulic material, which does not require a combination with any other admixture, is inexpensive, and is capable of suppressing a reduction in strength of a hardened concrete material, suppressing generation of a crack in a hardened concrete material by virtue of its excellent shrinkage-reducing ability, and imparting excellent freeze-thaw resistance. The shrinkage-reducing agent for a hydraulic material includes at least one kind of polyoxyalkylene compound (A) as an essential component, in which a concrete or a mortar produced by using the shrinkage-reducing agent for a hydraulic material has a spacing factor of 350 μm or less.

11 Claims, 1 Drawing Sheet

(56) References Cited

FOREIGN PATENT DOCUMENTS

| | | |
|---|---|---|
| JP | 9-301758 A | 11/1997 |
| JP | 2825855 B2 | 11/1998 |
| JP | 11-512385 A | 10/1999 |
| JP | 2001-294466 A | 10/2001 |
| JP | 2002-068813 A | 3/2002 |
| JP | 2004-091259 A | 3/2004 |
| JP | 2005-089228 A | 4/2005 |
| JP | 2006-206403 A | 8/2006 |
| JP | 2006-206404 A | 8/2006 |
| JP | 2008-050212 A | 3/2008 |
| JP | 2008-285336 A | 11/2008 |
| WO | 2008/117372 A1 | 10/2008 |
| WO | 2010/013744 A1 | 4/2010 |

OTHER PUBLICATIONS

Pore Structure of Cement-Based Materials: Testing, Interpreation and Requirements. Kaliopi K. Aligizaki. CRC Press, Sep. 22, 2005, p. 28-30.*

ASTM C 457-06. Jan. 2006.*

* cited by examiner

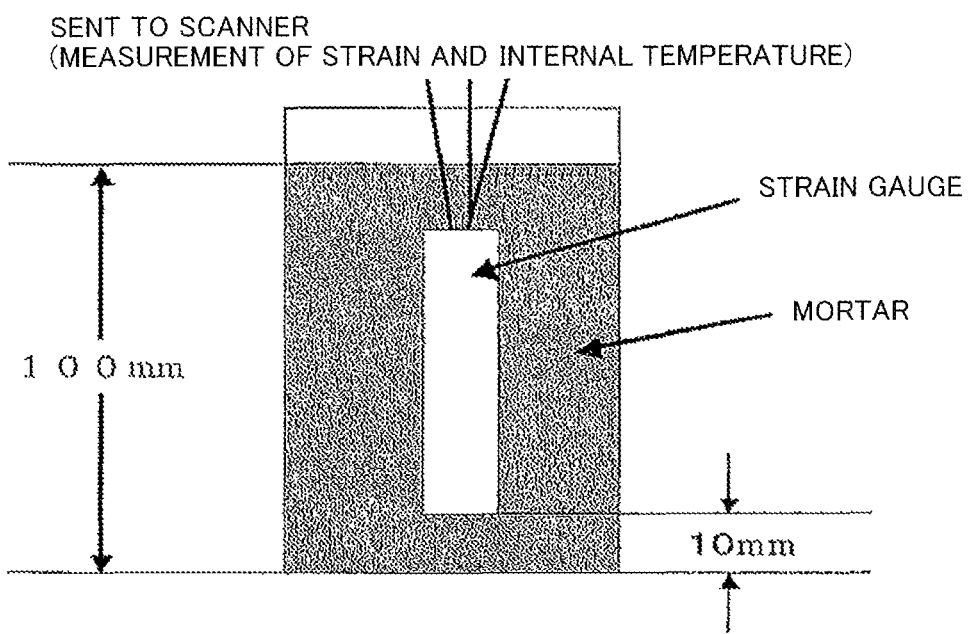

SHRINKAGE-REDUCING AGENT FOR HYDRAULIC MATERIAL

CROSS REFERENCE TO RELATED APPLICATIONS

This application is a National Stage of International Application No. PCT/JP2011/050164 filed Jan. 7, 2011, claiming priorities based on Japanese Patent Application Nos. 2010-00275$ filed Jan. 8, 2010, 2010-017861 filed Jan. 29, 2010, 2010-074245 filed Mar. 29, 2010, the contents of all of which are incorporated herein by reference in their entirety.

TECHNICAL FIELD

The present invention relates to a shrinkage-reducing agent for a hydraulic material, and more specifically, to a shrinkage-reducing agent for a hydraulic material, which is capable of imparting an excellent shrinkage-reducing ability and excellent freeze-thaw resistance.

BACKGROUND ART

A hydraulic material provides a hardened material excellent in strength, durability, and the like. Accordingly, the hydraulic material has been widely used as cement composition such as cement paste, a mortar, or a concrete. The hydraulic material is a material indispensable for construction of civil engineering and architectural structures.

After having hardened, the hydraulic material may cause dissipation of unreacted moisture remaining in the hardened material depending on, for example, ambient temperature and a humidity condition. As a result, such a problem that drying shrinkage progresses and hence the hardened material cracks to reduce its strength or durability arises. Reductions in strength, durability, and the like of each of the civil engineering and architectural structures cause serious problems such as a reduction in safety and an increase in repair cost.

Legal regulations against such problems have become increasingly stringent. Cracking of a concrete is also an object of defect liability in a law established in June 1999 concerning promotion of securing of housing quality. In the Japanese Architectural Standard Specification for Reinforced Concrete Work revised in February 2009 (JASS 5 (Architectural Institute of Japan)), a shrinkage strain in a concrete with long-term durability (100 years or more) at a 26th week was restricted to $800 \times 10^{-6}$ or less.

Emphasis has been recently placed on a shrinkage-reducing agent for a hydraulic material as means for reducing drying shrinkage of a hardened concrete material. Architectural Institute of Japan also established criteria concerning the shrinkage-reducing agent for a hydraulic material simultaneously with the revision of JASS 5 described above.

An alkylene oxide adduct of an alcohol having 1 to 4 carbon atoms (see Patent Literature 1), an ethylene oxide and propylene oxide co-adduct of a polyhydric alcohol having two to eight hydroxyl groups (see Patent Literature 2), an alkylene oxide adduct of a lower alkylamine (see Patent Literature 3), a polypropylene glycol in an oligomer region (see Patent Literature 4), low-molecular weight alcohols (see Patent Literature 5), and an alkylene oxide adduct of 2-ethylhexanol (see Patent Literature 6) have been reported as the shrinkage-reducing agent for a hydraulic material. However, those shrinkage-reducing agents for hydraulic materials each involve the following problem. When each of the agents is used in a concrete, strength of the concrete reduces. Accordingly, a ratio of cement paste needs to be increased in order that the strength may be secured. As a result, such a problem that a cost for the concrete increases arises.

Alkylene oxide adducts of polyhydric alcohols having two to eight hydroxyl groups have been reported as shrinkage-reducing agents for hydraulic materials, each of which is capable of suppressing a reduction in strength when used in a concrete (see Patent Literatures 7 and 8). However, any of those shrinkage-reducing agents for hydraulic materials requires a combination with any other admixture such as a powder resin or an expansive additive, and hence has been unable to solve the problem, i.e., the increase of the cost for the concrete.

Further, a hardened concrete material using any of those shrinkage-reducing agents for hydraulic materials has a problem in that its freeze-thaw resistance remarkably deteriorates. Thus, it is difficult to use the shrinkage-reducing agents for hydraulic materials in a cold region, and hence the shrinkage-reducing agents for hydraulic materials are significantly prevented from being widely marketed.

CITATION LIST

Patent Literature

[PTL 1] JP 56-51148 B
[PTL 2] JP 01-53214 B
[PTL 3] JP 01-53215 B
[PTL 4] JP 59-152253 A
[PTL 5] JP 06-6500 B
[PTL 6] JP 2825855 B2
[PTL 7] JP 09-301758 A
[PTL 8] JP 2002-68813 A

SUMMARY OF INVENTION

Technical Problem

An object of the present invention is to provide a shrinkage-reducing agent for a hydraulic material, which does not require a combination with any other admixture such as an expansive additive, a powder resin, or a limestone aggregate, the admixture having been conventionally used frequently for suppressing generation of a crack and reducing drying shrinkage, is inexpensive, and is capable of suppressing a reduction in strength of a hardened concrete material, suppressing generation of a crack in a hardened concrete material by virtue of its excellent shrinkage-reducing ability, and imparting excellent freeze-thaw resistance.

Solution to Problem

A shrinkage-reducing agent for a hydraulic material of the present invention includes at least one kind of polyoxyalkylene compound (A) as an essential component, in which a concrete or a mortar produced by using the shrinkage-reducing agent for a hydraulic material has spacing factor of 350 µm or less.

In a preferred embodiment, the shrinkage-reducing agent for a hydraulic material of the present invention further includes a water-reducing admixture (B).

In a preferred embodiment, the shrinkage-reducing agent for a hydraulic material of the present invention further includes an AE admixture (C) and an antifoaming agent (D), in which the content ratio of the AE admixture (C) to the antifoaming agent (D), the AE admixture (C)/the antifoaming agent (D), is 99/1 to 5/95 as a weight ratio in terms of solid content.

In a preferred embodiment, the polyoxyalkylene compound (A) has a weight-average molecular weight of more than 4,000.

In a preferred embodiment, the polyoxyalkylene compound (A) is represented by the following general formula (1):

$$RO\text{-}(AO)_n\text{---}H \qquad (1)$$

(in the formula (1): R represents a hydrogen atom or a hydrocarbon group having 1 to 30 carbon atoms; AO represents an oxyalkylene group having 2 to 18 carbon atoms; and n represents an average added mole number of the oxyalkylene groups and n represents 80 to 1,000).

In a preferred embodiment, the oxyalkylene groups included in the polyoxyalkylene compound (A) include 50 mol % or more of oxyethylene groups.

In a preferred embodiment, the polyoxyalkylene compound (A) is represented by the following general formula (2):

$$R^1\text{---}O\text{-}(EO)_m\text{---}H \qquad (2)$$

(in the formula (2): $R^1$ represents a hydrogen atom or a hydrocarbon group having 1 to 4 carbon atoms; EO represents an oxyethylene group; and m represents an average added mole number of EO's and m represents 80 to 1,000).

In a preferred embodiment, the water-reducing admixture (B) includes at least one kind of compound selected from the group consisting of a lignin sulfonate, a polyol derivative, a naphthalene sulfonic acid-formalin condensate, and a polymer having a polyoxyalkylene group and an anionic group.

In a preferred embodiment, the AE admixture (C) includes a polyoxyethylene alkyl ether sulfate and the content ratio of the polyoxyalkylene compound (A) to the AE admixture (C) is (A)/(C)=400 to 4,000 as a weight ratio.

In a preferred embodiment, the shrinkage-reducing agent for a hydraulic material of the present invention further includes a polyoxyalkyl ether (E) represented by the following general formula (3):

$$R^2\text{---}O\text{-}(AO)_p\text{---}R^3 \qquad (3)$$

(in the formula (3): $R^2$ represents a hydrocarbon group having 1 to 8 carbon atoms; $R^3$ represents a hydrogen atom or a hydrocarbon group having 1 to 8 carbon atoms; AO represents an oxyalkylene group having 2 to 4 carbon atoms; and p represents an average added mole number of AO's and p represents 2 to 30),
in which the content ratio of the polyoxyalkylene compound (A) to the polyoxyalkyl ether (E) is (A)/(E)=50/50 to 90/10 as a weight ratio.

Advantageous Effects of Invention

According to the present invention, it is possible to provide the shrinkage-reducing agent for a hydraulic material, which does not require a combination with any other admixture such as an expansive additive, a powder resin, or a limestone aggregate, the admixture having been conventionally used frequently for suppressing the generation of a crack and reducing drying shrinkage, is inexpensive, and is capable of suppressing a reduction in strength of a hardened concrete material, suppressing generation of a crack in a hardened concrete material by virtue of its excellent shrinkage-reducing ability, and imparting excellent freeze-thaw resistance.

BRIEF DESCRIPTION OF DRAWING

FIG. 1 A schematic view of an apparatus for measuring a self-strain of a mortar.

DESCRIPTION OF EMBODIMENTS

1. Shrinkage-Reducing Agent for Hydraulic Material

The spacing factor of a concrete or mortar using the shrinkage-reducing agent for a hydraulic material of the present invention is 350 μm or less, preferably 330 μm or less, more preferably 100 to 320 μm, still more preferably 100 to 300 μm. When the concrete or mortar using the shrinkage-reducing agent for a hydraulic material of the present invention has a spacing factor of 350 μm or less, excellent freeze-thaw resistance can be imparted to the resultant hardened concrete material, and hence a hardened concrete material having improved durability in a wider variety of environments can be provided. The value of the spacing factor can change depending on the air content of a concrete or a mortar, and hence the spacing factor is measured in the range of 5±1 vol % as the air content of the concrete or in the range of 3.0 to 6.0 vol % as the air content of the mortar.

<1-1. Polyoxyalkylene Compound (A)>

Examples of the polyoxyalkylene compound (A) included in the shrinkage-reducing agent for a hydraulic material include a compound obtained by adding an alkyleneoxide to an active hydrogen atom of a monohydric alcohol or a polyhydric alcohol. Preferred examples of such polyoxyalkylene compound include a compound obtained by adding an alkyleneoxide to an active hydrogen atom of a monohydric alcohol or a dihydric alcohol. The molecular weight of the polyoxyalkylene compound (A) contained in the shrinkage-reducing agent for a hydraulic material is preferably more than 4,000, more preferably 4,500 to 500,000, still more preferably 4,500 to 300,000, particularly preferably 5,000 to 100,000, as a weight-average molecular weight (Mw) in terms of polyethylene glycol determined by gel permeation chromatography (hereinafter, referred to as "GPC"). If the weight-average molecular weight (Mw) is 4,000 or less, an effect of imparting a shrinkage-reducing ability and freeze-thaw resistance is not sufficiently exerted, the effect being exerted by adding the shrinkage-reducing agent for a hydraulic material of the present invention, and the strength of the resultant hardened concrete material may be deteriorated.

The surface tension of 5 wt % aqueous solution of the polyoxyalkylene compound (A) (in terms of solid content) included in the shrinkage-reducing agent for a hydraulic material of the present invention is preferably 55 to 65 mN/m, more preferably 55 to 63 mN/m, still more preferably 55 to 62 mN/m. When the surface tension of 5 wt % aqueous solution of the polyoxyalkylene compound (A) (in terms of solid content) included in the shrinkage-reducing agent for a hydraulic material of the present invention is 55 to 65 mN/m, excellent freeze-thaw resistance can be imparted to the resultant hardened concrete material, and hence a hardened concrete material having improved durability in a wider variety of environments can be provided.

Any appropriate polyoxyalkylene compound may be used as the polyoxyalkylene compound (A) used in the shrinkage-reducing agent for a hydraulic material of the present invention. Preferred examples of such polyoxyalkylene compound include a polyoxyalkylene compound represented by the following general formula (1).

$$RO\text{-}(AO)_n\text{---}H \qquad (1)$$

In the general formula (1), R represents a hydrogen atom or a hydrocarbon group having 1 to 30 carbon atoms, and R preferably represents a hydrogen atom or a hydrocarbon group having 1 to 18 carbon atoms. If R represents a hydrogen atom or a hydrocarbon group having 1 to 30 carbon atoms, for example, when an antifoaming agent (D) and an AE admixture (C) are used in combination with the shrinkage-reducing agent for a hydraulic material, the content and quality of entrained air into a concrete can be easily adjusted, and hence an excellent shrinkage-reducing ability and excellent freeze-thaw resistance can be imparted.

In the general formula (1), AO represents an oxyalkylene group having 2 to 18 carbon atoms, preferably an oxyalkylene group having 2 to 4 carbon atoms. Specific examples thereof include an oxyethylene group, an oxypropylene group, and an oxybutylene group. The use of an oxyalkylene group having carbon atoms within the above-mentioned range allows the shrinkage-reducing agent for a hydraulic material of the present invention to be dissolved in water well. AO may represent only one kind of oxyalkylene group or may represent two or more kinds of oxyalkylene groups. In the case of the two or more kinds of oxyalkylene groups, $(AO)_n$ may represent a random sequence or a block sequence.

In the general formula (1), n represents an average added mole number of oxyalkylene groups. In the general formula (1), n represents 80 to 1,000, preferably 100 to 700, more preferably 100 to 500, still more preferably 100 to 400. The control of n within the range of 80 to 1,000 allows the shrinkage-reducing agent for a hydraulic material of the present invention not only to suppress a reduction in strength of a hardened concrete material but also to impart an excellent shrinkage-reducing ability and excellent freeze-thaw resistance.

Examples of the polyoxyalkylene compound represented by the general formula (1) include: polyalkyleneglycols such as polyethyleneglycol, polypropyleneglycol, and polyethylene/polypropyleneglycol; oxyethylene adducts of lower alcohols and higher alcohols each having 8 or more carbon atoms such as methoxypolyethyleneglycol, ethoxypolyethyleneglycol, propoxypolyethyleneglycol, butoxypolyethyleneglycol, pentyloxypolyethyleneglycol, hexyloxypentyloxypolyethyleneglycol, octyloxypentyloxypolyethyleneglycol, and nonylalkoxypolyethyleneglycol; adducts of two or more kinds of oxyalkylenes essentially including an oxyethylene of lower alcohols and higher alcohols each having 8 or more carbon atoms such as methoxypolyethylene/polypropyleneglycol, methoxypolyethylene/polybutyleneglycol, ethoxypolyethylene/polypropyleneglycol, ethoxypolyethylene/polybutyleneglycol, propoxypolyethylene/polypropyleneglycol, propoxypolyethylene/polybutyleneglycol, butoxypolyethylene/polypropyleneglycol, pentyloxypolyethylene/polybutyleneglycol, hexyloxypolyethylene/polypropyleneglycol, hexyloxypolyethylene/polybutyleneglycol, octyloxypolyethylene/polypropyleneglycol, octyloxypolyethylene/polybutyleneglycol, nonylalkoxypolyethylene/polypropyleneglycol, and nonylalkoxypolyethylene/polybutyleneglycol. Of those, polyethyleneglycol and oxyethylene adducts of lower alcohols such as methoxypolyethyleneglycol and ethoxypolyethyleneglycol are preferred because an excellent shrinkage-reducing ability and excellent freeze-thaw resistance can be imparted and cost can be kept low.

The oxyalkylene groups contained in the polyoxyalkylene compound (A) include preferably 50 mol % or more of oxyethylene groups, more preferably 70 mol % or more of oxyethylene groups, still more preferably 90 mol % or more of oxyethylene groups, particularly preferably 95 mol % or more of oxyethylene groups. When the oxyalkylene groups contained in the polyoxyalkylene compound (A) include 50 mol % or more of oxyethylene groups, an excellent shrinkage-reducing ability and excellent freeze-thaw resistance can be imparted and a reduction in strength can be suppressed.

The polyoxyalkylene compound (A) is preferably represented by the following general formula (2).

$$R^1\text{—}O\text{-}(EO)_m\text{—}H \qquad (2)$$

In the general formula (2), $R^1$ represents a hydrogen atom or a hydrocarbon group having 1 to 4 carbon atoms. Examples of the hydrocarbon group having 1 to 4 carbon atoms include a methyl group, an ethyl group, a n-propyl group, an i-propyl group, a n-butyl group, a sec-butyl group, an i-butyl group, and a tert-butyl group. $R^1$ preferably represents a hydrogen atom.

In the general formula (2), EO represents an oxyethylene group and m represents an average added mole number of EO's. In the general formula (2), m represents 80 to 1,000, preferably 85 to 800, more preferably 90 to 500. The control of m within the range of 80 to 1,000 allows the shrinkage-reducing agent for a hydraulic material of the present invention not only to suppress a reduction in strength of a hardened concrete material but also to impart an excellent shrinkage-reducing ability and excellent freeze-thaw resistance.

The content ratio of the polyoxyalkylene compound (A) in the shrinkage-reducing agent for a hydraulic material of the present invention is, as a weight ratio in terms of solid content with respect to 100 parts by weight of cement, preferably 0.5 to 20 wt %, more preferably 1 to 15 wt %, still more preferably 1 to 10 wt %, particularly preferably 2 to 10 wt %. The control of the content ratio of the polyoxyalkylene compound (A) within the range of 0.5 to 20 wt % allows the shrinkage-reducing agent for a hydraulic material of the present invention not only to suppress a reduction in strength of a hardened concrete material but also to impart an excellent shrinkage-reducing ability and excellent freeze-thaw resistance.

<1-2. Polyoxyalkyl Ether (E)>

The shrinkage-reducing agent for a hydraulic material of the present invention may include a polyoxyalkyl ether (E).

The polyoxyalkyl ether (E) is represented by the following general formula (3).

$$R^2\text{—}O\text{-}(AO)_p\text{—}R^3 \qquad (3)$$

In the general formula (3), $R^2$ represents a hydrocarbon group having 1 to 8 carbon atoms. Examples of the hydrocarbon group having 1 to 8 carbon atoms include a methyl group, an ethyl group, a propyl group, a butyl group, a pentyl group, a hexyl group, and an octyl group. $R^2$ preferably represents a propyl group or a butyl group.

In the general formula (3), $R^3$ represents a hydrogen atom or a hydrocarbon group having 1 to 8 carbon atoms. Specific examples of the hydrocarbon group having 1 to 8 carbon atoms include the same groups as those represented by $R^2$. $R^3$ preferably represents a hydrogen atom.

In the general formula (3), AO represents an oxyalkylene group having 2 to 4 carbon atoms. AO preferably represents an oxyethylene group. In the general formula (3), AO may represent only one kind of oxyalkylene group or may represent two or more kinds of oxyalkylene groups. In the case of the two or more kinds of oxyalkylene groups, $(AO)_p$ may represent a random sequence or a block sequence.

In the general formula (3), p represents an average added mole number of AO's. In the general formula (3), p represents 2 to 30, preferably 2 to 20, more preferably 2 to 10, still more preferably 2 to 6. The control of p within the range of 2 to 30 allows the shrinkage-reducing agent for a hydraulic material of the present invention not only to additionally suppress a reduction in strength of a hardened concrete material but also to impart an additionally excellent shrinkage-reducing ability and additionally excellent freeze-thaw resistance, by virtue of a synergistic effect exerted through the combined use of the polyoxyalkylene compound (A) and the polyoxyalkyl ether (E).

When the polyoxyalkyl ether (E) is included in the shrinkage-reducing agent for a hydraulic material of the present invention, the content ratio of the polyoxyalkyl ether (E) in the shrinkage-reducing agent for a hydraulic material of the present invention is, in terms of solid content with respect to 100 parts by weight of cement, preferably 0.5 to 20 wt %, more preferably 0.5 to 15 wt %, still more preferably 1 to 10 wt %. The control of the content ratio of the polyoxyalkyl ether (E) within the range of 0.5 to 20 wt % allows the shrinkage-reducing agent for a hydraulic material of the present invention not only to impart an additionally excellent shrinkage-reducing ability and additionally excellent freeze-thaw resistance.

When the polyoxyalkyl ether (E) is included in the shrinkage-reducing agent for a hydraulic material of the present invention, the shrinkage-reducing agent for a hydraulic material of the present invention includes the polyoxyalkylene compound (A) and the polyoxyalkyl ether (E) at a ratio of preferably (A)/(E)=50/50 to 90/10, more preferably (A)/(E)= 55/45 to 85/15, still more preferably (A)/(E)=60/40 to 80/20 as a weight ratio. When the ratio of (A)/(E) as the weight ratio is controlled within the above-mentioned range, a synergistic effect by virtue of the combined use of the polyoxyalkylene compound (A) and the polyoxyalkyl ether (E) is additionally exerted.

<1-3. Water-Reducing Admixture (B)>

The shrinkage-reducing agent for a hydraulic material of the present invention preferably further includes a water-reducing admixture (B). One kind of water-reducing admixture (B) may be included or two or more kinds of water-reducing admixture (B) may be included.

Any appropriate water-reducing admixture may be adopted as the water-reducing admixture (B). Examples of such water-reducing admixture include at least one kind of compound selected from the group consisting of a lignin sulfonate, a polyol derivative, a naphthalene sulfonic acid-formalin condensate, and a polymer having a polyoxyalkylene group and an anionic group.

Examples of the polymer having a polyoxyalkylene group and an anionic group include a copolymer obtained from monomers including an alkenyl ether-based monomer in which ethylene oxide or the like is added to an unsaturated alcohol such as 3-methyl-3-buten-1-ol and an unsaturated carboxylic acid-based monomer, and salts thereof, and a copolymer obtained from monomers including an (alkoxy) polyalkyleneglycol mono(meth)acrylate-based monomer and a (meth)acrylic acid-based monomer, and salts thereof.

When the water-reducing admixture (B) is included in the shrinkage-reducing agent for a hydraulic material of the present invention, the content ratio of the water-reducing admixture (B) in the shrinkage-reducing agent for a hydraulic material of the present invention is, in terms of solid content with respect to 100 parts by weight of cement, preferably 0.01 to 10 wt %, more preferably 0.05 to 10 wt %, still more preferably 0.1 to 5.0 wt %. The control of the content ratio of the water-reducing admixture (B) within the range of 0.01 to 10 wt % allows the shrinkage-reducing agent for a hydraulic material of the present invention to impart an additionally excellent shrinkage-reducing ability and additionally excellent freeze-thaw resistance.

When the water-reducing admixture (B) is included in the shrinkage-reducing agent for a hydraulic material of the present invention, the content ratio of the polyoxyalkylene compound (A) to the water-reducing admixture (B) is, as a weight ratio in terms of solid content, preferably 99.9/0.1 to 80/20, more preferably 99.5/0.5 to 80/20, still more preferably 99/1 to 85/15. The control of the content ratio of the polyoxyalkylene compound (A) to the water-reducing admixture (B) within the range of 99.9/0.1 to 80/20 as a weight ratio in terms of solid content can more efficiently provide a shrinkage-reducing agent for a hydraulic material, which does not require a combination with any other admixture, is inexpensive, suppresses a reduction in strength of a hardened concrete material, suppresses generation of a crack in a hardened concrete material by virtue of its excellent shrinkage-reducing ability, and is capable of imparting excellent freeze-thaw resistance.

<1-4. AE Admixture (C) and Antifoaming Agent (D)>

The shrinkage-reducing agent for a hydraulic material of the present invention preferably further includes an AE admixture (air entraining admixture) (C) and an antifoaming agent (D). One kind of AE admixture (C) may be included or two or more kinds of AE admixture (C) may be included. One kind of antifoaming agent (D) may be included or two or more kinds of antifoaming agents (D) may be included.

Any appropriate AE agent may be adopted as the AE admixture (C). Examples of the AE admixture (C) include resin soaps, saturated or unsaturated fatty acids, sodium hydroxystearate, lauryl sulfate, alkylbenzenesulfonates (ABSs), linear alkylbenzenesulfonates (LASs), alkanesulfonates, polyoxyethylene alkyl (phenyl)ethers, polyoxyethylene alkyl (phenyl)ether sulfuric acid esters or salts thereof, polyoxyethylene alkyl (phenyl)ether phosphoric acid esters or salts thereof, proteinic materials, alkenylsulfosuccinates, and α-olefin sulfonates.

When the AE admixture (C) is included in the shrinkage-reducing agent for a hydraulic material of the present invention, the content ratio of the AE admixture (C) in the shrinkage-reducing agent for a hydraulic material of the present invention is, in terms of solid content with respect to 100 parts by weight of cement, preferably 0.000001 to 10 wt %, more preferably 0.00001 to 5 wt %. The control of the content ratio of the AE admixture (C) within the range of 0.000001 to 10 wt % allows the shrinkage-reducing agent for a hydraulic material of the present invention to impart additionally excellent freeze-thaw resistance.

Preferred examples of the AE admixture (C) include a polyoxyethylene alkyl ether sulfate.

The polyoxyethylene alkyl ether sulfate is preferably represented by the following general formula (4).

$$R^4\text{—O-(EO)}_q\text{—SO}_3M \tag{4}$$

In the general formula (4), $R^4$ represents a hydrocarbon group having 8 to 18 carbon atoms. Examples of the hydrocarbon group having 8 to 18 carbon atoms include an octyl group, a nonyl group, a decyl group, an undecyl group, a dodecyl group (lauryl group), a tridecyl group, a tetradecyl group, a pentadecyl group, a hexadecyl group, a heptadecyl group, and an octadecyl group. EO represents an oxyethylene group, and q represents an average added mole number of EO's and q represents 2 to 8. M represents a hydrogen atom or an alkali metal.

When a polyoxyethylene alkyl ether sulfate is included as the AE admixture (C) in the shrinkage-reducing agent for a hydraulic material of the present invention, the shrinkage-reducing agent for a hydraulic material of the present invention includes the polyoxyalkylene compound (A) and the AE admixture (C) at a ratio of preferably (A)/(C)=400 to 4,000, more preferably (A)/(C)=430 to 3,800, still more preferably (A)/(C)=450 to 3,500 as a weight ratio. The control of the ratio of (A)/(C) within the above-mentioned range as the weight ratio allows the shrinkage-reducing agent for a hydraulic material of the present invention to impart additionally excellent freeze-thaw resistance.

Any appropriate antifoaming agent may be adopted as the antifoaming agent (D). Examples of the antifoaming agent (D) include mineral oil-based antifoaming agents, fat and oil-based antifoaming agents, fatty acid-based antifoaming agents, fatty acid ester-based antifoaming agents, oxyalkylene-based antifoaming agents, alcohol-based antifoaming agents, amide-based antifoaming agents, phosphoric acid ester-based antifoaming agents, metal soap-based antifoaming agents, and silicone-based antifoaming agents. Of those, oxyalkylene-based antifoaming agents are preferred.

Examples of the mineral oil-based antifoaming agents include kerosene and liquid paraffin.

Examples of the fat and oil-based antifoaming agents include animal or vegetable oils, sesame oil, castor oil, and alkylene oxide adducts thereof.

Examples of the fatty acid-based antifoaming agents include oleic acid, stearic acid, and alkylene oxide adducts thereof.

Examples of the fatty acid ester-based antifoaming agents include glycerin monoricinoleate, alkenyl succinic acid derivatives, sorbitol monolaurate, sorbitol trioleate, and natural waxes.

Examples of the oxyalkylene-based antifoaming agents include: polyoxyalkylenes such as (poly)oxyethylene (poly)oxypropylene adducts; (poly)oxyalkylence alkyl ethers such as diethylene glycol heptyl ether, polyoxyethylene oleyl ether, polyoxypropylene butyl ether, polyoxyethylene polyoxypropylene 2-ethylhexyl ether, and oxyethylene oxypropylene adducts of higher alcohols each having 8 or more carbon atoms and secondary alcohols each having 12 to 14 carbon atoms; (poly)oxyalkylene (alkyl) aryl ethers such as polyoxypropylene phenyl ether and polyoxyethylene nonyl phenyl ether; acetylene ethers each produced by addition polymerization of an alkylene oxide onto an acetylene alcohol such as 2,4,7,9-tetramethyl-5-decyne-4,7-diol, 2,5-dimethyl-3-hexyne-2,5-diol, and 3-methyl-1-butyn-3-ol; (poly) oxyalkylene fatty acid esters such as diethylene glycol oleate, diethylene glycol laurate, and ethylene glycol distearate; (poly)oxyalkylenesorbitan fatty acid esters such as polyoxyethylenesorbitan monolaurate and polyoxyethylenesorbitan trioleate; (poly)oxyalkylene alkyl (aryl)ether sulfuric acid ester salts such as sodium polyoxypropylene methyl ether sulfate and sodium polyoxyethylene dodecylphenol ether sulfate; (poly)oxyalkylene alkyl phosphoric acid esters such as (poly)oxyethylene stearyl phosphate; (poly)oxyalkylene alkylamines such as polyoxyethylene laurylamine; and polyoxyalkylene amides.

Examples of the alcohol-based antifoaming agents include octyl alcohol, 2-ethylhexyl alcohol, hexadecyl alcohol, acetylene alcohols, and glycols.

Examples of the amide-based antifoaming agents include acrylate polyamines.

Examples of the phosphoric acid ester-based antifoaming agents include tributyl phosphate and sodium octyl phosphate.

Examples of the metal soap-based antifoaming agents include aluminum stearate and calcium oleate.

Examples of the silicone-based antifoaming agents include dimethyl silicone oil, silicone paste, silicone emulsion, organically modified polysiloxanes (polyorganosiloxanes such as dimethylpolysiloxane), and fluorosilicone oil.

When the antifoaming agent (D) is included in the shrinkage-reducing agent for a hydraulic material of the present invention, the content ratio of the antifoaming agent (D) in the shrinkage-reducing agent for a hydraulic material of the present invention is, in terms of solid content with respect to 100 parts by weight of cement, preferably 0.000001 to 10 wt %, more preferably 0.00001 to 5 wt %. The control of the content ratio of the antifoaming agent (D) within the range of 0.000001 to 10 wt % allows the shrinkage-reducing agent for a hydraulic material of the present invention to impart an additionally excellent shrinkage-reducing ability and additionally excellent freeze-thaw resistance.

When the AE admixture (C) and the antifoaming agent (D) are included in the shrinkage-reducing agent for a hydraulic material of the present invention, the content ratio of the AE admixture (C) to the antifoaming agent (D) is, as a weight ratio in terms of solid content, preferably 99/1 to 5/95, more preferably 95/5 to 10/90, still more preferably 90/10 to 15/85. The control of the content of the AE admixture (C) to the antifoaming agent (D) within the range of 99/1 to 5/95 as the weight ratio in terms of solid content can more efficiently provide a shrinkage-reducing agent for a hydraulic material, which does not require a combination with any other admixture, is inexpensive, suppresses a reduction in strength of a hardened concrete material, suppresses generation of a crack in a hardened concrete material by virtue of its excellent shrinkage-reducing ability, and is capable of imparting excellent freeze-thaw resistance.

<1-5. pH Adjuster>

The shrinkage-reducing agent for a hydraulic material of the present invention may include a pH adjuster. Any appropriate compound may be adopted as the pH adjuster as long as it is a compound having a function of adjusting the pH of the shrinkage-reducing agent for a hydraulic material to a pH around the neutral pH (pH of 5 to 9). When the pH adjuster is included in the shrinkage-reducing agent for a hydraulic material of the present invention, an effect of suppressing the discoloration and denaturation of the polyoxyalkylene compound (A) is exerted, resulting in providing good storage stability to the shrinkage-reducing agent for a hydraulic material of the present invention.

Examples of the pH adjuster include alkali metal salts or alkaline earth metal salts of an acid. Specific examples thereof include alkali metal salts of an inorganic acid, alkaline earth metal salts of an inorganic acid, alkali metal salts of an organic acid, and alkaline earth metal salts of an organic acid. Examples of the inorganic acid include hydrochloric acid, sulfuric acid, sulfurous acid, persulfuric acid, sulfurous acid, phosphoric acid, phosphorous acid, nitric acid, nitrous acid, and carbonic acid. Examples of the organic acid include formic acid, acetic acid, propionic acid, butyric acid, isobutyric acid, valeric acid, caproic acid, enanthic acid, carpylic acid, 2-ethylhexanoic acid, lauric acid, stearic acid, oleic acid, elaidic acid, erucic acid, malonic acid, succinic acid, glutaric acid, adipic acid, lactic acid, tartaric acid, citric acid, malic acid, gluconic acid, acrylic acid, methacrylic acid, and maleic acid. In the pH adjusters, the acid is preferably at least one kind selected from hydrochloric acid, sulfuric acid, phosphoric acid, formic acid, acetic acid, propionic acid, butyric acid, succinic acid, glutaric acid, citric acid, malic acid, and gluconic acid, and a metal salt to be combined with the acid is preferably at least one kind selected from a sodium salt, a potassium salt, a magnesium salt, and a calcium salt. The pH adjusters may be used alone or in combination.

When the pH adjuster is included in the shrinkage-reducing agent for a hydraulic material of the present invention, the content ratio of the pH adjuster to the polyoxyalkylene compound (A) is, as a weight ratio in terms of solid content, preferably pH adjuster/polyoxyalkylene compound (A)=1/50 to 1/1,000,000, more preferably pH adjuster/polyoxyalkylene compound (A)=1/50 to 1/100,000, still more preferably pH adjuster/polyoxyalkylene compound (A)=1/100 to 1/100,000, particularly preferably pH adjuster/polyoxyalkylene compound (A)=1/100 to 1/10,000.

<1-6. Composition>

When the shrinkage-reducing agent for a hydraulic material of the present invention is formed so as to include a polyoxyalkylene compound (A), a water-reducing admixture (B), an AE admixture (C), and an antifoaming agent (D), the ratio of the amount of the polyoxyalkylene compound (A) accounting for the total amount of the polyoxyalkylene compound (A), the water-reducing admixture (B), the AE admixture (C), and the antifoaming agent (D) is, as a weight ratio in terms of solid content, preferably 85 to 99.5 wt %, more preferably 90 to 99 wt %. The control of the ratio of the amount of the polyoxyalkylene compound (A) accounting for the total amount of the polyoxyalkylene compound (A), the water-reducing admixture (B), the AE admixture (C), and the antifoaming agent (D) within the above-mentioned range as the weight ratio in terms of solid content allows the shrinkage-reducing agent for a hydraulic material of the present invention to impart an additionally excellent shrinkage-reducing ability and additionally excellent freeze-thaw resistance.

When the shrinkage-reducing agent for a hydraulic material of the present invention is formed so as to include a polyoxyalkylene compound (A), a water-reducing admixture (B), an AE admixture (C), and an antifoaming agent (D), the ratio of the amount of the water-reducing admixture (B) accounting for the total amount of the polyoxyalkylene compound (A), the water-reducing admixture (B), the AE admixture (C), and the antifoaming agent (D) is, as a weight ratio in terms of solid content, preferably 0.5 to 10 wt %, more preferably 1 to 8 wt %. The control of the ratio of the amount of the water-reducing admixture (B) accounting for the total amount of the polyoxyalkylene compound (A), the water-reducing admixture (B), the AE admixture (C), and the antifoaming agent (D) within the above-mentioned range as the weight ratio in terms of solid content allows the shrinkage-reducing agent for a hydraulic material of the present invention to impart an additionally excellent shrinkage-reducing ability and additionally excellent freeze-thaw resistance.

When the shrinkage-reducing agent for a hydraulic material of the present invention is formed so as to include a polyoxyalkylene compound (A), a water-reducing admixture (B), an AE admixture (C), and an antifoaming agent (D), the ratio of the amount of the AE admixture (C) accounting for the total amount of the polyoxyalkylene compound (A), the water-reducing admixture (B), the AE admixture (C), and the antifoaming agent (D) is, as a weight ratio in terms of solid content, preferably 0.005 to 1 wt %, more preferably 0.01 to 0.1 wt %. The control of the ratio of the amount of the AE admixture (C) accounting for the total amount of the polyoxyalkylene compound (A), the water-reducing admixture (B), the AE admixture (C), and the antifoaming agent (D) within the above-mentioned range as the weight ratio in terms of solid content allows the shrinkage-reducing agent for a hydraulic material of the present invention to impart an additionally excellent shrinkage-reducing ability and additionally excellent freeze-thaw resistance.

When the shrinkage-reducing agent for a hydraulic material of the present invention is formed so as to include a polyoxyalkylene compound (A), a water-reducing admixture (B), an AE admixture (C), and an antifoaming agent (D), the ratio of the amount of the antifoaming agent (D) accounting for the total amount of the polyoxyalkylene compound (A), the water-reducing admixture (B), the AE admixture (C), and the antifoaming agent (D) is, as a weight ratio in terms of solid content, preferably 0.0005 to 1 wt %, more preferably 0.001 to 0.5 wt %. The control of the ratio of the amount of the antifoaming agent (D) accounting for the total amount of the polyoxyalkylene compound (A), the water-reducing admixture (B), the AE admixture (C), and the antifoaming agent (D) within the above-mentioned range as the weight ratio in terms of solid content allows the shrinkage-reducing agent for a hydraulic material of the present invention to impart an additionally excellent shrinkage-reducing ability and additionally excellent freeze-thaw resistance.

When the shrinkage-reducing agent for a hydraulic material of the present invention is formed so as to include a polyoxyalkylene compound (A), a water-reducing admixture (B), an AE admixture (C), and an antifoaming agent (D), the ratio of the total amount of the polyoxyalkylene compound (A) and the water-reducing admixture (B) to the total amount of the AE admixture (C) and the antifoaming agent (D) is, as a weight ratio in terms of solid content, preferably 99.99/0.01 to 90/10, more preferably 99.99/0.01 to 95/5, still more preferably 99.99/0.01 to 98/2. The control of the ratio of the total amount of the polyoxyalkylene compound (A) and the water-reducing admixture (B) to the total amount of the AE admixture (C) and the antifoaming agent (D) within the above-mentioned range as the weight ratio in terms of solid content allows the shrinkage-reducing agent for a hydraulic material of the present invention to impart an additionally excellent shrinkage-reducing ability and additionally excellent freeze-thaw resistance.

When the shrinkage-reducing agent for a hydraulic material of the present invention is formed so as to include a polyoxyalkylene compound (A), a polyoxyalkyl ether (E), and an antifoaming agent (D), the ratio of the total amount of the polyoxyalkylene compound (A) and the polyoxyalkyl ether (E) to the amount of the antifoaming agent (D) is, as a weight ratio in terms of solid content, preferably 99.99/0.01 to 90/10, more preferably 99.99/0.01 to 95/5, still more preferably 99.99/0.01 to 98/2. The control of the ratio of the total amount of the polyoxyalkylene compound (A) and the polyoxyalkyl ether (E) to the amount of the antifoaming agent (D) in the shrinkage-reducing agent for a hydraulic material within the above-mentioned range as the weight ratio in terms of solid content allows the shrinkage-reducing agent for a hydraulic material of the present invention not only to additionally suppress a reduction in strength of a hardened concrete material but also to impart an additionally excellent shrinkage-reducing ability and additionally excellent freeze-thaw resistance, by virtue of a synergistic effect exerted through the combined use of the polyoxyalkylene compound (A) and the polyoxyalkyl ether (E).

The shrinkage-reducing agent for a hydraulic material of the present invention may be formed of only the polyoxyalkylene compound (A) or may be formed of the polyoxyalkylene compound (A) and at least one kind selected from the water-reducing admixture (B), the AE admixture (C), the antifoaming agent (D), and the polyoxyalkyl ether (E). Alternatively, the shrinkage-reducing agent for a hydraulic material of the present invention may include the pH adjuster as required.

The shrinkage-reducing agent for a hydraulic material of the present invention may contain any other component as required as long as actions and effects of the present invention are exerted. Examples of the other component include water, a water-soluble polymer substance, a polymer emulsion, a retardant, a high-early-strength agent/accelerator, a surfactant, a waterproof agent, a rust inhibitor, a crack-reducing agent, an expansive additive, a cement-wetting agent, a thickener, a segregation-reducing agent, a flocculant, any other drying shrinkage-reducing agent such as a polyalkylene glycol, a strength-enhancing agent, a self-leveling agent, a colorant, an antifungal agent, blast-furnace slag, fly ash, cinder ash, clinker ash, husk ash, silica fume, silica powder, and plaster. Those other components may be used alone or in combination.

However, there is no need to use such other components as listed above excluding water unless otherwise required because the shrinkage-reducing agent for a hydraulic material of the present invention can exert such effects as described below. The agent does not require a combination with any other admixture, is inexpensive, suppresses a reduction in strength of a hardened concrete material, suppresses generation of a crack in a hardened concrete material by virtue of its excellent shrinkage-reducing ability, and is capable of imparting excellent freeze-thaw resistance.

2. Preparation of Shrinkage-Reducing Agent for Hydraulic Material

The shrinkage-reducing agent for a hydraulic material of the present invention may be prepared by any appropriate method. It is recommended, for example, to use a polyoxyalkylene compound (A) as an essential component and mix with it at least one kind selected from a water-reducing admixture (B), an AE admixture (C), an antifoaming agent (D), a polyoxyalkyl ether (E), a pH adjuster, and any other appropriate component by using any appropriate method. Any appropriate order of mixing may be adopted as the order of the mixing.

The shrinkage-reducing agent for a hydraulic material of the present invention has both of an excellent shrinkage-reducing ability and excellent freeze-thaw resistance. The shrinkage-reducing agent for a hydraulic material of the present invention includes the polyoxyalkylene compound (A) at a high concentration, the polyoxyalkylene compound (A) being excellent in stability over time, thus not being separated or precipitated and being excellent in compatibility, and hence the agent is applicable to a concrete in a wide range of a water/cement ratio, and even a concrete having a water/cement ratio (weight ratio) of preferably 60% to 15% can be produced. Therefore, the agent has high general-purpose property and can be used by being added to the cement compositions for various applications.

3. Concrete Composition

A concrete composition includes the shrinkage-reducing agent for a hydraulic material of the present invention and cement. In this case, any process for the preparation of a concrete composition may be adopted as long as a concrete composition including the respective constituents of the shrinkage-reducing agent for a hydraulic material of the present invention and cement is finally prepared. That is, it is possible to mix preliminarily some components selected from the respective constituent components (the respective constituent components of the shrinkage-reducing agent for a hydraulic material of the present invention, cement, and other components as required) constituting a concrete composition and then mix the balance with the mixture, to thereby prepare the concrete composition. Alternatively, the whole of the respective constituent components constituting a concrete composition may be mixed at one time.

The concrete composition preferably includes an aggregate and water. Examples of the aggregate include a fine aggregate and a coarse aggregate. Note that a concrete composition including a fine aggregate and water and not including a coarse aggregate is sometimes called a mortar.

Examples of cement include normal, low-heat, moderate-heat, high-early-strength, ultra-high-early-strength, or sulfate-resistant Portland cement, blast-furnace cement, silica cement, fly ash cement, ecocement, and silica fume cement.

Examples of the fine aggregate include river sand, mountain sand, sea sand, crushed sand, a heavy aggregate, a lightweight aggregate, a slag aggregate, and a recycled aggregate.

Examples of the coarse aggregate include river gravel, a crushed stone, a heavy aggregate, a lightweight aggregate, a slag aggregate, and a recycled aggregate.

Examples of the water include tap water described in JIS A 5308 Appendix 9, water except tap water (such as river water, lake water, or well water), and recycled water.

Any appropriate additive may be added in the concrete composition. Examples of the additive include a hardening accelerator, a setting retarder, a rust inhibitor, a waterproof agent, an antiseptic, and a powder. Examples of the powder include silica fume, fly ash, limestone fine powder, blast-furnace slag fine powder, an expansive additive, and any other mineral fine powder.

Any appropriate method may be adopted as a method of, for example, producing, conveying, pouring, curing, or managing the concrete composition.

The concrete composition may be used as it is as a concrete (fresh concrete).

Any appropriate amount may be adopted as the addition amount of the shrinkage-reducing agent for a hydraulic material of the present invention in the concrete composition depending on purposes. For example, the amount is preferably 0.5 to 10.0 wt % with respect to 100 parts by weight of the cement. In addition, when cement volume per 100 parts by volume of the cement composition exceeds 14 vol %, the amount is preferably 0.5 to 10.0 wt %, more preferably 0.5 to 6.0 wt % with respect to 100 parts by weight of the cement.

EXAMPLES

Hereinafter, the present invention is described in more detail by way of examples. However, the present invention is not limited to these examples. It should be noted that the terms "part(s)" and "%" in the examples refer to "part(s) by weight" and "wt %," respectively unless otherwise stated.

Conditions for Measurement of Molecular Weight by GPC

Columns used: TSKguardcolumn SWXL+TSKgel G4000SWXL+G3000SWXL+G2000SWXL manufactured by TOSOH CORPORATION
Eluent: Used is an eluent solution that is prepared by dissolving 115.6 g of sodium acetate trihydrate in a mixed solvent of 10,999 g of water and 6,001 g of acetonitrile, and adjusting the pH of the resultant to 6.0 with a 30% aqueous solution of sodium hydroxide.
Injection amount: 0.5% eluent solution 100 μL
Flow rate of eluent: 0.8 mL/min
Column temperature: 40° C.
Standard reference material: polyethylene glycol, weight-average
molecular weight (Mw): 272,500; 219,300; 85,000; 46,000; 24,000; 12,600; 4,250; 7,100; and 1,470.
Order of calibration curve: cubic expression
Detector: Waters 410 Differential Refractive Index Detector, manufactured by Nihon Waters K.K.

Analysis software: MILLENNIUM Ver. 3.21, manufactured by Nihon Waters K.K.

Measurement of Surface Tension

A 5 wt % aqueous solution of the solid content of a polyoxyalkylene compound was prepared, and its temperature was adjusted to 20° C. After that, the surface tension of the aqueous solution was measured by using a dynamic surface tensiometer (SITA Science line t60 (SITA Messtechnik GmbH.)). A measurement value at a frequency of 0.5 Hz was defined as the surface tension.

Evaluations of Concrete for its Physical Properties (Measurement of Solid Content of each Component Added to Concrete)

The solid content of each component used for a shrinkage-reducing agent for a hydraulic material used in the evaluations of a concrete for its physical properties was measured by the following method.

1. An aluminum dish was precisely weighed.
2. A component whose solid content was to be measured was mounted on the aluminum dish that had been precisely weighed, and was then precisely weighed.
3. Under a nitrogen atmosphere, the aluminum dish having mounted thereon the component that had been precisely weighed in the above-mentioned section 2 was loaded into a drying oven with its temperature adjusted to 130° C. for 1 hour.
4. After a lapse of 1 hour, the aluminum dish and the component whose solid content was to be measured were taken out of the drying oven, and were then left standing to cool in a desiccator for 15 minutes.
5. After a lapse of 15 minutes, the aluminum dish and the component whose solid content was to be measured (after the drying), which had been taken out of the desiccator, were precisely weighed.
6. The solid content was calculated from the following equation with the weights measured in the foregoing.

Solid content (%)={[(weight obtained in precise weighing of the above-mentioned section 5)−(weight of aluminum dish obtained in precise weighing of the above-mentioned section 1)]/[(weight obtained in precise weighing of the above-mentioned section 2)−(weight of aluminum dish obtained in precise weighing of the above-mentioned section 1)]}×100

(Evaluations of Fresh Concrete)

The resultant fresh concrete was measured for its slump flow, slump value, and air content by the following methods.

Slump flow: JIS A 1150-2001
Slump value: JIS A 1101-1998
Air content: JIS A 1128-1998

(Measurement of Spacing Factor)

A spacing factor serving as an indicator for freeze-thaw resistance was measured with an air void analyzer (AVA; product name, manufactured by Germann Instruments Inc). Glycerin (reagent (manufactured by Wako Pure Chemical Industries, Ltd.)) and water were preliminarily mixed at a weight ratio of glycerin/water=83/17 to prepare a solution for AVA measurement.

After the air content (air content=5±1 vol %) in a fresh concrete taken out from a mixer had been measured, an aggregate having a size of 6 mm or more were removed from the concrete, and 20 ml of a mortar for evaluating a spacing factor were collected in a dedicated syringe. About 2,000 ml of water were injected into a column for measurement, air bubbles attached to the wall surface of the column were removed with a brush, and then 250 ml of the solution for AVA measurement preliminarily prepared as described above were injected into the bottom portion of the column by using a dedicated tool. After the injection, a petri dish for collecting air bubbles was placed near the water surface in the column and was fixed to a measurement portion. After 20 ml of the mortar collected in the syringe had been injected into the bottom portion of the column, the mortar was stirred for 30 seconds so that the entrained air in the mortar was sufficiently released into the liquid. The spacing factor was calculated by measuring the amount of the released air bubbles over time.

In order to calculate the spacing factor, it is necessary to calculate a value (mortar volume ratio) by subtracting a volume occupied by an aggregate having a size of 6 mm or more from the total volume of a fresh concrete and calculate a volume occupied by a paste (paste volume ratio) in addition to measuring the air content in the fresh concrete. The mortar volume ratio and the paste volume ratio were calculated on the basis of the following equations (I) and (II), respectively.

$$\text{Mortar volume ratio (\%)} = [(V_B + V_W + V_S)/1{,}000] \times 100 \quad (I)$$

$$\text{Paste volume ratio (\%)} = [(V_S + V_W)/1{,}000] \times 100 \quad (II)$$

$V_B$: Volume of a binder (=unit content of binder (kg)/specific gravity of binder)

$V_W$: Volume of water and an admixture (equivalent to unit water content)

$V_S$: Volume of an aggregate having a size of 6 mm or less (=unit content of fine aggregate/specific gravity of fine aggregate)

(Evaluation for Drying Shrinkage-Reducing Ability)

The resultant fresh concrete was loaded into a specimen mold having a gauge pin and measuring 10 cm by 10 cm by 40 cm, and was then subjected to sealed curing at 20° C. for 2 days, followed by demolding. The specimen after the demolding was subjected to water curing in still water for an additional 5 days. Then, the specimen was evaluated for its drying shrinkage-reducing ability.

The evaluation for the drying shrinkage-reducing ability was carried out in conformity with JIS A 1129-3 (Methods of test for length change of mortar and concrete Part 3: Method with dial gauge).

Immediately after water on the surface of the specimen subjected to the water curing in still water for 5 days had been wiped off with a paper towel, the length of the specimen was measured, and the length at this time was defined as a reference. After that, the specimen was stored in a thermo-hygrostat with its temperature and humidity set to 20° C. and 60%, respectively, and the lengths of the specimen were measured at the appropriate times. The shrinkage amount of the specimen was calculated from the measured lengths, and a length change ratio was calculated from the following equation. As represented by the following equation, the length change ratio represents a ratio of the shrinkage amount of the specimen containing a shrinkage-reducing agent of each example or each comparative example to the shrinkage amount of the reference concrete. A smaller value for the ratio indicates a larger extent to which the shrinkage can be reduced.

Length change ratio={(shrinkage amount of concrete using reducing agent of each example or each comparative example)/(shrinkage amount of reference concrete)}×100

(Evaluation for Freeze-Thaw Resistance)

The resultant fresh concrete was loaded into a specimen mold measuring 10 cm by 10 cm by 40 cm, and was then subjected to sealed curing at 20° C. for 2 days, followed by demolding. The specimen after the demolding was subjected to curing in still water at 20° C. for an additional 5 days. After that, the specimen was evaluated for its freeze-thaw resistance.

The evaluation for the freeze-thaw resistance was performed in accordance with the method A in JIS A 1148-2001 by measuring a first resonance frequency and a specimen weight in accordance with JIS A 1127-2001 every 30 cycles.

As represented by the following equation (III), the freeze-thaw resistance every 30 cycles in this case was evaluated by calculating a relative dynamic modulus of elasticity from a first resonance frequency at the time of the termination of each cycle with respect to a first resonance frequency before the initiation of a freezing and thawing cycle (0 cycles). The maximum number of freezing and thawing cycles was set to 300, and the evaluation was terminated when the relative dynamic modulus of elasticity became 60% or less before the 300 cycles. The final freeze-thaw resistance was evaluated by calculating a durability factor represented by the following equation (IV). As each of the relative dynamic modulus of elasticity and the durability factor is closer to 100, the freeze-thaw resistance of the specimen is better.

A case where the relative dynamic modulus of elasticity at the time of 300 cycles was 60% or more was represented by Symbol "○", and a case where the relative dynamic modulus of elasticity at the time of 300 cycles was less than 60% was represented by Symbol "x".

$$\text{Relative dynamic modulus of elasticity (\%)} = (f_n^2/f_0^2) \times 100 \quad \text{(III)}$$

$f_n$: A first resonance frequency (Hz) after n cycles of freezing and thawing $f_0$: A first resonance frequency (Hz) after 0 cycles of freezing and thawing $$\text{Durability factor} = (P \times N)/300 \quad \text{(IV)}$$

P: A relative dynamic modulus of elasticity (%) at the time of N cycles of freezing and thawing N: The smaller one of the number of cycles of freezing and thawing at which a relative dynamic modulus of elasticity (%) becomes 60% or less and 300

Evaluation of Mortar for its Drying Shrinkage-Reducing Ability and Measurement of Spacing Factor (Mortar Mixing)

Mortar mixing was performed by using 225 g of a product obtained by weighing a predetermined amount of the shrinkage-reducing agent for a hydraulic material of the present invention and diluting the agent with water, 450 g of normal Portland cement (manufactured by Taiheiyo Cement Corporation), and 1,350 g of standard sand for a cement strength test (specified in 5.1.3 of JIS R 5201-1997 Appendix 2: Japan Cement Association) with a Hobart mortar mixer (manufactured by Hobart, model: N-50) in accordance with the method of JIS R 5201-1997.

In addition, an antifoaming agent (ADEKANOL LG299) was used as required to adjust a mortar air content to 3 to 6 vol %.

(Measurement of Mortar Air Content)

The mortar air content was measured with a 500-ml measuring cylinder in conformity with JIS A 1174 (a test method for the unit volume mass of a polymer cement mortar that had not hardened yet and a test method for an air content on the basis of a mass (mass method)).

(Evaluation for Drying Shrinkage-Reducing Ability)

A mortar specimen (4×4×16 cm) for a drying shrinkage-reducing ability evaluation was produced in accordance with JIS A 1129. A silicon grease was applied to a mold in advance so that water was stopped and demolding was able to be easily performed. In addition, gauge studs were mounted on both ends of the specimen. The mold into which a mortar obtained by the mixing had been poured was placed in a container, and then the container was hermetically sealed. The mold was stored at 20° C. so that initial curing was performed. After a lapse of 1 day, the specimen was demolded, and then the silicon grease adhering to the specimen was water-washed with a scrubbing brush. Subsequently, the specimen was subjected to curing in still water at 20° C. for 6 days (water curing). Immediately after water on the surface of the specimen subjected to the curing in still water for 6 days had been wiped off with a paper towel, the length of the specimen was measured with a dial gauge (manufactured by Nishinihon Shikenki) in accordance with JIS A 1129, and the length at this time was defined as a reference. After that, the specimen was stored in a thermo-hygrostat with its temperature and humidity set to 20° C. and 60%, respectively, and the lengths of the specimen were regularly measured. As represented by the following equation, a length change ratio in this case is a ratio of the shrinkage amount of the mortar to which the shrinkage-reducing agent is added to the shrinkage amount of a reference mortar. A smaller value for the ratio indicates a larger extent to which the shrinkage can be reduced. It should be noted that a mortar to which no shrinkage-reducing agent was added was used as the reference mortar.

Length change ratio={(shrinkage amount of mortar to which shrinkage-reducing agent is added)/(shrinkage amount of reference mortar)}×100

In addition to the length change ratio, the weight of the specimen at each material age was measured and the weight reduction ratio of the specimen was calculated on the basis of the following equation. A larger value for the weight reduction ratio indicates a larger amount of water evaporation from the specimen.

Weight reduction ratio (%)={(W0−WX)/W0}×100

W0: Weight (g) of a specimen at a material age of 0 days
WX: Weight (g) of a specimen at a material age of X days (Measurement of Flow Value and Evaluation for Flow Value Ratio)

The flow value of the resultant mortar was measured in accordance with JIS R 5201-1997.

A flow value ratio is the ratio of the mortar flow value of a mortar containing the shrinkage-reducing agent of each example or each comparative example to the mortar flow value of a reference mortar, and is a value obtained on the basis of the following equation. A larger mortar flow value indicates a less influence on the viscosity. It should be noted that a mortar to which no shrinkage-reducing agent was added was used as the reference mortar.

Flow value ratio={(flow value of mortar to which shrinkage-reducing agent is added)/(flow value of reference mortar)}×100

(Measurement of Spacing Factor)

After a mortar had been mixed so as to have a predetermined air content (3.0 to 6.0 vol %), the spacing factor of the mortar serving as an indicator for its freeze-thaw resistance was measured with an air void analyzer (AVA; product name, manufactured by Germann Instruments Inc).

First, 250 ml of a solution for AVA measurement and about 2,000 ml of water with their temperatures adjusted to 20° C.

were weighed. Next, after the solution and water had been charged into a column, 20 ml of the mortar were collected and injected into the bottom of the column. After the injection, the mortar was stirred for 30 seconds so that the entrained air in the mortar was sufficiently released into the liquid. The spacing factor of the mortar was calculated by measuring the amount of the released air bubbles over time.

In order to calculate the spacing factor, it is necessary to calculate a value (mortar volume ratio) by subtracting a volume occupied by an aggregate having a size of 6 mm or more from the total volume of a mortar and calculate a ratio occupied by a paste (paste volume ratio) in addition to measuring the air content in the mortar. Here, the mortar volume ratio was defined as 100% and the paste volume ratio was calculated on the basis of the following equation.

Paste volume ratio (%)=$[(V_C+V_A)/(V_C+V_A+V_{IS})] \times 100$ $V_C$: Volume of a binder (=additive amount (g) of binder/specific gravity of binder)

$V_A$: Volume of water and an admixture (equivalent to additive amount)

$V_{IS}$: Volume of a fine aggregate (sand) (=additive amount (g) of fine aggregate (sand)/specific gravity of fine aggregate (sand))

A smaller value for the spacing factor indicates that air bubbles entrained in the mortar are smaller and are dispersed more densely (air bubbles with good quality are entrained in the mortar), and hence the mortar has more excellent freeze-thaw resistance.

Measurement of Autogeneous-Shrinkage Strain in Mortar (Mortar Mixing)

Mortar mixing was performed by using 213.7 g of a product obtained by weighing a predetermined amount of the shrinkage-reducing agent for a hydraulic material of the present invention and diluting the agent with water, 485.7 g of a normal Portland cement manufactured by Taiheiyo Cement Corporation, and 1,350 g of standard sand for a cement strength test (specified in 5.1.3 of JIS R 5201-1997 Appendix 2) with a Hobart mortar mixer (manufactured by Hobart Corporation, model number: N-50). The mortar mixing was carried out at a low speed (first velocity) throughout.

In addition, a water-reducing admixture, an antifoaming agent, and the like were used to adjust the flow value of the mortar to 200±20 mm and to adjust its air content in the range of ±3%.

More specifically, after the normal Portland cement had been subjected to dry mixing for 5 seconds, water and the shrinkage-reducing agent for a hydraulic material were fed into the cement over 15 seconds, the whole was further mixed for 10 seconds, and the mixing was then stopped. The standard sand for a cement strength test was fed into the mixture over 30 seconds, followed by additional mixing for 60 seconds. The mixing was stopped and the mixture was scraped off for 20 seconds. After that, mixing was additionally performed for 120 seconds and was then stopped to take out the resultant mortar.

(Measurement of Autogeneous-Shrinkage Strain)

A autogeneous-shrinkage strain was measured by using a strain gauge (model type: KMC-70-120-H4 (Kyowa Electronic Instruments CO., LTD.)).

Simultaneously with the measurement of the autogeneous-shrinkage strain of a mortar, the measurement of its setting time was also performed by measuring its penetration resistance, and its setting start time was designated as the start time of the measurement of the autogeneous-shrinkage strain.

FIG. 1 illustrates a schematic view of the apparatus.

A polypropylene container measuring an aperture diameter of 91 mm by a bottom diameter of 84 mm by a height of 127 mm was used as a mortar container. Further, a silicon grease was applied to the inside of the container so that a mortar did not attach to the container. After a mortar was charged in the container, the container was closed with a polyvinylidene chloride sheet and was stored at 20±2° C., and then the autogeneous-shrinkage strain of the mortar was measured.

On the basis of the resultant value for the autogeneous-shrinkage strain, the length change ratio of the mortar was calculated by using the following equation.

Length change ratio={(shrinkage amount of mortar to which shrinkage-reducing agent is added)/(shrinkage amount of reference mortar)}×100

The measurement of the setting time (setting start time and setting finish time) of a mortar was carried by measuring its penetration resistance value in accordance with ASTM C 403/C and 403M-99 in a room whose inside temperature was set to 20±2° C.

The mortar obtained through mixing was put in a polypropylene container (measuring an aperture diameter of 91 mm by a bottom diameter of 84 mm by a height of 127 mm), divided into two portions and the measurement of the penetration resistance value of the mortar was started 3 or 4 hours after water injection. The elapsed time that it took for the penetration resistance value to reach 3.5 N/mm$^2$ from the water injection was defined as a setting start time. Similarly, the elapsed time that it took for the penetration resistance value to reach 28.0 N/mm$^2$ from the water injection was defined as a setting finish time.

Production Example A-1

Synthesis of Copolymer (A-1)

First, 14.66 parts by weight of ion-exchanged water and 49.37 parts by weight of an unsaturated polyalkylene glycol ether monomer (IPN50) obtained by adding an average of 50 moles of ethylene oxide to 3-methyl-3-buten-1-ol were loaded into a reactor made of glass provided with a temperature gauge, a stirring machine, a dropping apparatus, a nitrogen-introducing pipe, and a reflux condenser. Next, the air in the reactor was replaced with nitrogen under stirring, and then the temperature in the reactor was increased to 60° C. under a nitrogen atmosphere. After that, 2.39 parts by weight of a 2% aqueous solution of hydrogen peroxide were added to the mixture. An aqueous solution formed of 3.15 parts by weight of acrylic acid and 0.79 part by weight of ion-exchanged water was dropped to the reactor over 3.0 hours, and an aqueous solution formed of 0.13 part by weight of 3-mercaptopropionic acid, 0.06 part by weight of L-ascorbic acid, and 15.91 parts by weight of ion-exchanged water was dropped to the reactor over 3.5 hours. After that, the temperature was continuously maintained at 60° C. for 1 hour, and was then cooled so that a polymerization reaction was terminated. The pH of the resultant was adjusted to 7.0 with a 48% aqueous solution of sodium hydroxide. Thus, an aqueous solution of a copolymer (A-1) having a weight-average molecular weight of 37,700 was obtained.

Production Example A-2

Synthesis of Copolymer (A-2)

First, 42.43 parts by weight of ion-exchanged water and 49.37 parts by weight of the IPN50 were loaded into a reactor made of glass provided with a temperature gauge, a stirring machine, a dropping apparatus, a nitrogen-introducing pipe, and a reflux condenser. Next, the air in the reactor was replaced with nitrogen under stirring, and then the temperature in the reactor was increased to 60° C. under a nitrogen atmosphere. After that, 4.12 parts by weight of a 2% aqueous solution of hydrogen peroxide were added to the mixture. An aqueous solution formed of 3.11 parts by weight of acrylic acid, 5.90 parts by weight of 2-hydroxyethyl acrylate, and 2.26 parts by weight of ion-exchanged water was dropped to the reactor over 3.0 hours, and an aqueous solution formed of 0.33 part by weight of 3-mercaptopropionic acid, 0.11 part by weight of L-ascorbic acid, and 15.91 parts by weight of ion-exchanged water was dropped to the reactor over 3.5 hours. After that, the temperature was continuously maintained at 60° C. for 1 hour, and was then cooled so that a polymerization reaction was terminated. The pH of the resultant was adjusted to 7.0 with a 48% aqueous solution of sodium hydroxide. Thus, an aqueous solution of a copolymer (A-2) having a weight-average molecular weight of 31,900 was obtained.

Production Example A-3

Synthesis of Copolymer Mixture PC-1

The copolymer (A-1) obtained in Production Example A-1 and the copolymer (A-2) obtained in Production Example A-2 were mixed at a weight ratio of "copolymer (A-1)/copolymer (A-2)=30/70." Thus, an aqueous solution of a copolymer mixture PC-1 was obtained.

Various Components Used in Example A-1 to Example A-8 and Comparative Example A-1 to Comparative Example A-3

Table 1 shows polyoxyalkylene compounds (A), water-reducing admixture (B), an AE admixture (C), and an antifoaming agent (D) used in Example A-1 to Example A-8 and Comparative Example A-1 to Comparative Example A-3.

TABLE 1

| | Name | |
|---|---|---|
| Polyoxyalkylene compound (A) | PEG4600 | Reagent (manufactured by Sigma-Aldrich Co. LLC) (polyethylene glycol having a weight-average molecular weight of 4,600) |
| | PEG6000 | PEG6000 (manufactured by Dai-ichi Kogyo Seiyaku Co., Ltd.) (polyethylene glycol having a weight-average molecular weight of 6,000) |
| | PEG10000 | PEG10000 (manufactured by Dai-ichi Kogyo Seiyaku Co., Ltd.) (polyethylene glycol having a weight-average molecular weight of 10,000) |
| Water-reducing admixture (B) | PC-1 | Copolymer mixture obtained in Production Example A-3 (copolymer mixture containing the copolymer (A-1) at 30 wt % and the copolymer (A-2) at 70 wt %) |
| | No. 70 | Pozzolith No. 70 (manufactured by BASF Pozzolith Ltd.) (lignin sulfonic acid-polyol complex) |
| AE admixture (C) | AE-1 | ADEKA NATE YES-25 (manufactured by ADEKA CORPORATION) (higher alcohol ethoxysulfate) |

TABLE 1-continued

| | Name | |
|---|---|---|
| Antifoaming agent (D) | DEF-1 | ADEKANOL LG299 (manufactured by ADEKA CORPORATION) (polyoxyalkylene glycol alkyl ether) |

Example A-1 to Example A-3 and Comparative Example A-1

Blending

The respective materials were weighed according to the blending ratios shown in Table 2 so that a mixing volume was 30 L, and then the materials were mixed with a pan mixer. It should be noted that cement used was a mixture of equal amounts of normal Portland cement (each having a specific gravity of 3.16) manufactured by Taiheiyo Cement Corporation, Sumitomo Osaka Cement Co., Ltd., and UBE-MITSUBISHI CEMENT CORPORATION. A mixture produced by mixing land sand collected in Kakegawa and land sand collected in Kimitsu at a weight ratio of "land sand collected in Kakegawa/land sand collected in Kimitsu=80/20" was used as a fine aggregate. A hard sandstone collected in Ome was used as a coarse aggregate.

TABLE 2

| | | Unit content (kg/m³) | | | |
|---|---|---|---|---|---|
| Water cement ratio (W/C) | Ratio of fine aggregate (s/a) | Cement | Water and shrinkage-reducing admixture | Fine aggregate | Coarse aggregate |
| 45% | 47 | 382 | 172 | 797 | 930 |

(Mixing of Materials)

The coarse aggregate and a half amount of the fine aggregates to be used were loaded into a mixer, and then the contents were subjected to dry mixing for 5 seconds. After that, rotation was stopped, and then the cement and the remaining fine aggregates were loaded. After the contents had been subjected to dry mixing for an additional 5 seconds, the rotation was stopped again, and then water containing the shrinkage-reducing agent formed of the polyoxyalkylene compound (A) and the water-reducing admixture (B), the AE admixture (C), and the antifoaming agent (D) was added to the mixture. After the contents had been mixed for 90 seconds, the fresh concrete was taken out of the mixer. It should be noted that, when the materials were mixed, commercially available air content adjusters (the AE admixture (C) and antifoaming agent (D) listed in Table 1) and PC-1 serving as the water-reducing admixture (B) were used, and the slump flow of the fresh concrete and its air content were adjusted to 350 to 400 mm and 5±1%, respectively. In this case, the mortar volume ratio and paste volume ratio in the fresh concrete were 60.4% and 29.3%, respectively. Table 3 shows the blending ratios of the materials.

TABLE 3

| | Addition amount of shrinkage-reducing admixture (% with respect to cement) | | | | | |
|---|---|---|---|---|---|---|
| | Polyoxyalkylene compound (A) | | Water-reducing admixture (B) | AE admixture (C) | Anti-foaming agent (D) | (C)/(D) |
| | Polyoxyalkylene compound | Addition amount | | | | |
| Example A-1 | PEG6000 | 2.0 | 0.120 | 0.0010 | 0.00340 | 22.7/77.3 |
| Example A-2 | PEG10000 | 2.0 | 0.120 | 0.0010 | 0.00050 | 66.7/33.3 |
| Example A-3 | PEG10000 | 4.0 | 0.160 | 0.0010 | 0.00016 | 86.2/13.8 |
| Comparative Example A-1 | — | — | 0.120 | 0.0010 | 0.00060 | 62.5/37.5 |

*All the addition amounts of the admixtures are values in terms of solid content.

(Evaluations)

The resultant fresh concrete using the shrinkage-reducing agent for a hydraulic material was evaluated for its spacing factor, drying shrinkage-reducing ability, and freeze-thaw resistance. Table 4 shows the results of the evaluations.

TABLE 4

| | Physical properties of concrete | | | | |
|---|---|---|---|---|---|
| | Flow (mm) | Air content (vol %) | Spacing factor (μm) | Durability factor | Length change ratio (material age of 8 weeks) |
| Example A-1 | 375 | 5.0 | 210 | 88 | 84 |
| Example A-2 | 370 | 5.2 | 204 | 90 | 85 |
| Example A-3 | 390 | 5.2 | 171 | 93 | 62 |
| Comparative Example A-1 | 390 | 5.2 | 235 | 88 | 100 |

Table 4 shows that the length change ratio of each of Example A-1 to Example A-3, in which a shrinkage-reducing agent for a hydraulic material including the polyoxyalkylene compound (A) and the water-reducing admixture (B) was used, was smaller in comparison to the length change ratio of Comparative Example A-1, in which a shrinkage-reducing agent for a hydraulic material including no polyoxyalkylene compound (A) was used. Further, it is found that, in each of Example A-1 to Example A-3, the concrete shows a smaller spacing factor, thus having good freeze-thaw resistance, and has excellent durability. It is found from these results that the use of the shrinkage-reducing agent for a hydraulic material of any of Example A-1 to Example A-3 can suppress the shrinkage of the resultant hydraulic material, and that the resultant hydraulic material has excellent freeze-thaw resistance and excellent durability. On the other hand, the shrinkage-reducing agent for a hydraulic material of Comparative Example A-1 was excellent in imparting freeze-thaw resistance but was not able to suppress the shrinkage of the resultant hydraulic material sufficiently.

Example A-4 to Example A-8 and Comparative Example A-2 to Comparative Example A-3

Blending

The respective materials were weighed according to the blending ratios shown in Table 5 so that a mixing volume was 30 L, and then the materials were mixed with a pan mixer. It should be noted that cement used was a mixture of equal amounts of normal Portland cement (each having a specific gravity of 3.16) manufactured by Taiheiyo Cement Corporation, Sumitomo Osaka Cement Co., Ltd., and UBE-MITSUBISHI CEMENT CORPORATION. A mixture produced by mixing land sand collected in Kakegawa and land sand collected in Kimitsu at a weight ratio of "land sand collected in Kakegawa/land sand collected in Kimitsu=80/20" was used as a fine aggregate. A hard sandstone collected in Ome was used as a coarse aggregate.

TABLE 5

| | | | Unit content (kg/m³) | | |
|---|---|---|---|---|---|
| Water cement ratio (W/C) | Ratio of fine aggregate (s/a) | Cement | Water and shrinkage-reducing admixture | Fine aggregate | Coarse aggregate |
| 53% | 48 | 320 | 170 | 837 | 942 |

(Mixing of Materials)

The coarse aggregate and a half amount of the fine aggregates to be used were loaded into a mixer, and then the contents were subjected to dry mixing for 5 seconds. After that, rotation was stopped, and then the cement and the remaining fine aggregates were loaded. After the contents had been subjected to dry mixing for an additional 5 seconds, the rotation was stopped again, and then water containing the shrinkage-reducing agent formed of the polyoxyalkylene compound (A) and the water-reducing admixture (B), the AE admixture (C) and the antifoaming agent (D) was added to the mixture. After the contents had been mixed for 90 seconds, the fresh concrete was taken out of the mixer. It should be noted that, when the materials were mixed, commercially available air content adjusters (the AE admixture (C) and antifoaming agent (D) listed in Table 1) and Pozzolith No. 70 serving as the water-reducing admixture (B) were used, and the slump flow value of the fresh concrete and its air content were adjusted to 16±2 cm and 5±1%, respectively. In this case, the mortar volume ratio and paste volume ratio in the fresh concrete were 59.9% and 27.1%, respectively. Table 6 shows the blending ratios of the materials.

TABLE 6

| | Polyoxyalkylene compound (A) | | Water-reducing admixture (B) | AE admixture (C) | Anti-foaming agent (D) | (C)/(D) |
|---|---|---|---|---|---|---|
| | Polyoxyalkylene compound | Addition amount | | | | |
| Example A-4 | PEG4600 | 2.0 | 0.12 | 0.0010 | 0.00050 | 66.7/33.3 |
| Example A-5 | PEG6000 | 2.0 | 0.12 | 0.0010 | 0.00100 | 50/50 |
| Example A-6 | PEG6000 | 4.0 | 0.12 | 0.0010 | 0.00060 | 62.5/37.5 |
| Example A-7 | PEG10000 | 2.0 | 0.12 | 0.0010 | 0.00120 | 45.5/54.5 |
| Example A-8 | PEG10000 | 4.0 | 0.12 | 0.0010 | 0.00080 | 55.6/44.4 |
| Comparative Example A-2 | — | — | 0.12 | 0.0010 | — | 100/0 |
| Comparative Example A-3 | PEG6000 | 2.0 | 0.12 | 0.0003 | — | 100/0 |

*All the addition amounts are values in terms of solid content.

(Evaluations)

The resultant fresh concrete using the shrinkage-reducing agent for a hydraulic material was evaluated for its spacing factor, drying shrinkage-reducing ability, and freeze-thaw resistance. Table 7 shows the results of the evaluations.

TABLE 7

| | Physical properties of concrete | | | | |
|---|---|---|---|---|---|
| | Slump (cm) | Air content (vol %) | Spacing factor (μm) | Durability factor | Length change ratio (material age of 8 weeks) |
| Example A-4 | 15.0 | 5.0 | 210 | 88 | 59 |
| Example A-5 | 15.0 | 5.0 | 266 | 86 | 63 |
| Example A-6 | 15.5 | 5.0 | 220 | 90 | 46 |
| Example A-7 | 17.5 | 5.3 | 267 | 85 | 62 |
| Example A-8 | 15.0 | 4.8 | 237 | 82 | 44 |
| Comparative Example A-2 | 16.0 | 5.1 | 323 | 80 | 100 |
| Comparative Example A-3 | 15.5 | 5.2 | 397 | 23 | 62 |

Table 7 shows that, as with Example A-1 to Example A-3, Example A-4 to Example A-8, in which a shrinkage-reducing agent for a hydraulic material including a polyoxyalkylene compound (A) and a water-reducing admixture (B) was used, each had a smaller length change ratio, a smaller spacing factor, thus having good freeze-thaw resistance, and excellent durability. It is found from these results that the use of the shrinkage-reducing agent for a hydraulic material of any of Example A-4 to Example A-8 can also suppress the shrinkage of the resultant hydraulic material, and that the resultant hydraulic material has excellent freeze-thaw resistance and excellent durability. On the other hand, the shrinkage-reducing agent for a hydraulic material of Comparative Example A-2 was excellent in freeze-thaw resistance but was not able to suppress the shrinkage of the resultant hydraulic material sufficiently because the agent included no polyoxyalkylene compound (A). Further, the shrinkage-reducing agent for a hydraulic material of Comparative Example A-3 was excellent in drying shrinkage ability, but the concrete had a spacing factor of more than 350 μm, thus having low freeze-thaw resistance, and had remarkably poor durability.

Example B-1

Polyethylene glycol (product name: Polyethylene Glycol 4000, manufactured by Wako Pure Chemical Industries, Ltd., m=91, molecular weight=4,000), which served as the polyoxyalkylene compound (A), a polyoxyethylene alkyl ether sulfate ADEKA HOPE YES25 (manufactured by ADEKA CORPORATION), which served as the AE admixture (C), and a polyoxyalkylene alkyl ether ADEKANOL LG299 (manufactured by ADEKA CORPORATION), which served as the antifoaming agent (D), were mixed at the blending ratios shown in Table 8. Thus, a shrinkage-reducing agent for a hydraulic material was obtained.

(Blending)

The respective materials were metered according to the following concrete blending ratios so that a mixing volume was 30 L, and then the materials were mixed with a forced action biaxial mixer. It should be noted that cement used was a mixture of equal amounts of normal Portland cement (each having a specific gravity of 3.16) manufactured by Taiheiyo Cement Corporation, Sumitomo Osaka Cement Co., Ltd., and UBE-MITSUBISHI CEMENT CORPORATION. In this case, land sand produced in Kakegawa and land sand produced in Kimitsu were each used as a fine aggregate, and an Ome hard sandstone was used as a coarse aggregate. In addition, the air content of a concrete was adjusted to 5.0±0.5%.

<Concrete Blending Ratios>

Unit cement content: 301 kg/m$^3$

Unit water content: 160 kg/m$^3$

Unit fine aggregate content: 824 kg/m$^3$

Unit coarse aggregate content: 1,002 kg/m$^3$ (Water/cement ratio (W/C): 53.1%, fine aggregate ratio (s/a): 46.0%)

(Mixing of Materials)

The coarse aggregate and a half amount of the fine aggregates to be used were loaded into a mixer, and then the contents were subjected to dry mixing for 5 seconds. After that, rotation was stopped, and then the cement and the remaining fine aggregates were loaded. After the contents had been subjected to dry mixing for an additional 5 seconds, the rotation was stopped again, and then the shrinkage-reducing agent for a hydraulic material and Pozzolith No. 70 (manufactured by BASF Pozzolith Ltd.), which served as the water-reducing admixture (B), were added at 0.17% with respect to the cement in terms of solid content to the mixture. After the contents had been mixed for 90 seconds, the concrete was taken out of the mixer.

(Evaluations)

Table 9 shows the results of the evaluations of the concrete that had been taken out (fresh concrete).

Example B-2

Polyethylene glycol (product name: XG1000, manufactured by Nippon Shokubai Co., Ltd., m=227, molecular weight=10,000), which served as the polyoxyalkylene compound (A), a polyoxyethylene alkyl ether sulfate ADEKA HOPE YES25 (manufactured by ADEKA CORPORATION), which served as the AE admixture (C), and a polyoxyalkylene alkyl ether ADEKANOL LG299 (manufactured by ADEKA CORPORATION), which served as the antifoaming agent (D), were mixed at the blending ratios shown in Table 8. Thus, a shrinkage-reducing agent for a hydraulic material was obtained.

(Blending)

The respective materials were metered according to the following concrete blending ratios so that a mixing volume was 30 L, and then the materials were mixed with a pan forced action mixer. It should be noted that cement used was a mixture of equal amounts of normal Portland cement (each having a specific gravity of 3.16) manufactured by Taiheiyo Cement Corporation, Sumitomo Osaka Cement Co., Ltd., and UBE-MITSUBISHI CEMENT CORPORATION. In this case, land sand produced in Kakegawa and land sand produced in Kimitsu were each used as a fine aggregate, and an Ome hard sandstone was used as a coarse aggregate. In addition, the air content of a concrete was adjusted to 5.0±0.5%.

<Concrete Blending Ratios>
Unit cement content: 350 kg/m$^3$
Unit water content: 175 kg/m$^3$
Unit fine aggregate content: 841 kg/m$^3$
Unit coarse aggregate content: 905 kg/m$^3$
(Water/cement ratio (W/C): 50.0%, fine aggregate ratio (s/a): 49.0%)

(Mixing of Materials)

The coarse aggregate and a half amount of the fine aggregates to be used were loaded into a mixer, and then the contents were subjected to dry mixing for 5 seconds. After that, rotation was stopped, and then the cement and the remaining fine aggregates were loaded. After the contents had been subjected to dry mixing for an additional 5 seconds, the rotation was stopped again, and then the shrinkage-reducing agent for a hydraulic material and RHEOBUILD SP8LS (manufactured by BASF Pozzolith Ltd.), which served as the water-reducing admixture (B), were added at 0.065% with respect to the cement in terms of solid content to the mixture. After the contents had been mixed for 90 seconds, the concrete was taken out of the mixer.

(Evaluations)

Table 9 shows the results of the evaluations of the concrete that had been taken out (fresh concrete).

Comparative Example B-1

Polyethylene glycol (product name: PEG2000, manufactured by Wako Pure Chemical Industries, Ltd., m=45, molecular weight=2,000), which served as the polyoxyalkylene compound (A), a polyoxyethylene alkyl ether sulfate ADEKA HOPE YES25 (manufactured by ADEKA CORPORATION), which served as the AE admixture (C), and a polyoxyalkylene alkyl ether ADEKANOL LG299 (manufactured by ADEKA CORPORATION), which served as the antifoaming agent (D), were mixed at the blending ratios shown in Table 8. Thus, a shrinkage-reducing agent for a hydraulic material was obtained.

(Blending)

The respective materials were metered according to the following concrete blending ratios so that a mixing volume was 30 L, and then the materials were mixed with a pan forced action mixer. It should be noted that cement used was a mixture of equal amounts of normal Portland cement (each having a specific gravity of 3.16) manufactured by Taiheiyo Cement Corporation, Sumitomo Osaka Cement Co., Ltd., and UBE-MITSUBISHI CEMENT CORPORATION. In this case, land sand produced in Kakegawa and land sand produced in Kimitsu were each used as a fine aggregate, and an Ome hard sandstone was used as a coarse aggregate. In addition, the air content of a concrete was adjusted to 5.0±0.5%.

<Concrete Blending Ratios>
Unit cement content: 350 kg/m$^3$
Unit water content: 175 kg/m$^3$
Unit fine aggregate content: 841 kg/m$^3$
Unit coarse aggregate content: 905 kg/m$^3$
(Water/cement ratio (W/C): 50.0%, fine aggregate ratio (s/a): 49.0%)

(Mixing of Materials)

The coarse aggregate and a half amount of the fine aggregates to be used were loaded into a mixer, and then the contents were subjected to dry mixing for 5 seconds. After that, rotation was stopped, and then the cement and the remaining fine aggregates were loaded. After the contents had been subjected to dry mixing for an additional 5 seconds, the rotation was stopped again, and then the shrinkage-reducing agent for a hydraulic material and Pozzolith No. 70 (manufactured by BASF Pozzolith Ltd.), which served as the water-reducing admixture (B), were added at 0.17% with respect to the cement in terms of solid content to the mixture. After the contents had been mixed for 90 seconds, the concrete was taken out of the mixer.

(Evaluations)

Table 9 shows the results of the evaluations of the concrete that had been taken out (fresh concrete).

Reference Example B-1

Polyethylene glycol (product name: PEG3400, manufactured by Wako Pure Chemical Industries, Ltd., m=77, molecular weight=3,400), which served as the polyoxyalkylene compound (A), a polyoxyethylene alkyl ether sulfate ADEKA HOPE YES25 (manufactured by ADEKA CORPORATION), which served as the AE admixture (C), and a polyoxyalkylene alkyl ether ADEKANOL LG299 (manufactured by ADEKA CORPORATION), which served as the antifoaming agent (D), were mixed at the blending ratios shown in Table 8. Thus, a shrinkage-reducing agent for a hydraulic material was obtained.

(Blending)

The respective materials were metered according to the following concrete blending ratios so that a mixing volume was 30 L, and then the materials were mixed with a pan forced action mixer. It should be noted that cement used was a mixture of equal amounts of normal Portland cement (each having a specific gravity of 3.16) manufactured by Taiheiyo Cement Corporation, Sumitomo Osaka Cement Co., Ltd., and UBE-MITSUBISHI CEMENT CORPORATION. In this case, land sand produced in Kakegawa and land sand produced in Kimitsu were each used as a fine aggregate, and an Ome hard sandstone was used as a coarse aggregate. In addition, the air content of a concrete was adjusted to 5.0±0.5%.

<Concrete Blending Ratios>
Unit cement content: 350 kg/m$^3$
Unit water content: 175 kg/m$^3$
Unit fine aggregate content: 841 kg/m$^3$
Unit coarse aggregate content: 905 kg/m$^3$ (Water/cement ratio (W/C): 50.0%, fine aggregate ratio (s/a): 49.0%)

(Mixing of Materials)

The coarse aggregate and a half amount of the fine aggregates to be used were loaded into a mixer, and then the contents were subjected to dry mixing for 5 seconds. After that, rotation was stopped, and then the cement and the remaining fine aggregates were loaded. After the contents had been subjected to dry mixing for an additional 5 seconds, the rotation was stopped again, and then the shrinkage-reducing agent for a hydraulic material and Pozzolith No. 70 (manufactured by BASF Pozzolith Ltd.), which served as the water-reducing admixture (B), were added at 0.17% with respect to the cement in terms of solid content to the mixture. After the contents had been mixed for 90 seconds, the concrete was taken out of the mixer.

(Evaluations)

Table 9 shows the results of the evaluations of the concrete that had been taken out (fresh concrete).

Comparative Example B-2

An ethylene oxide 3-mol adduct of butanol ($Bu(EO)_3$, product name: triethylene glycol mono-n-butyl ether, manufactured by Wako Pure Chemical Industries, Ltd.), which served as the polyoxyalkylene compound (A), a polyoxyethylene alkyl ether sulfate ADEKA HOPE YES25 (manufactured by ADEKA CORPORATION), which served as the AE admixture (C), and a polyoxyalkylene alkyl ether ADEKANOL LG299 (manufactured by ADEKA CORPORATION), which served as the antifoaming agent (D), were mixed at the blending ratios shown in Table 8. Thus, a shrinkage-reducing agent for a hydraulic material was obtained.

(Blending)

The respective materials were metered according to the following concrete blending ratios so that a mixing volume was 30 L, and then the materials were mixed with a forced action biaxial mixer. It should be noted that cement used was a mixture of equal amounts of normal Portland cement (each having a specific gravity of 3.16) manufactured by Taiheiyo Cement Corporation, Sumitomo Osaka Cement Co., Ltd., and UBE-MITSUBISHI CEMENT CORPORATION. In this case, land sand produced in Kakegawa and land sand produced in Kimitsu were each used as a fine aggregate, and an Ome hard sandstone was used as a coarse aggregate. In addition, the air content of a concrete was adjusted to 5.0±2.0%.

<Concrete Blending Ratios>

Unit cement content: 301 $kg/m^3$

Unit water content: 160 $kg/m^3$

Unit fine aggregate content: 824 $kg/m^3$

Unit coarse aggregate content: 1,002 $kg/m^3$ (Water/cement ratio (W/C): 53.1%, fine aggregate ratio (s/a): 46.0%)

(Mixing of Materials)

The coarse aggregate and a half amount of the fine aggregates to be used were loaded into a mixer, and then the contents were subjected to dry mixing for 5 seconds. After that, rotation was stopped, and then the cement and the remaining fine aggregates were loaded. After the contents had been subjected to dry mixing for an additional 5 seconds, the rotation was stopped again, and then the shrinkage-reducing agent for a hydraulic material and RHEOBUILD SP8LS (manufactured by BASF Pozzolith Ltd.), which served as the water-reducing admixture (B), were added at 0.065% with respect to the cement in terms of solid content to the mixture. After the contents had been mixed for 90 seconds, the concrete was taken out of the mixer.

(Evaluations)

Table 9 shows the results of the evaluations of the concrete that had been taken out (fresh concrete).

TABLE 8

| | | Blending ratio of each component (% with respect to cement) | | | | |
|---|---|---|---|---|---|---|
| | Component (A) | Component (A) Addition amount | Component (C) Kind Addition amount | Component (D) Kind Addition amount | Blending ratio (weight ratio) | |
| | Kind | (wt %) | (wt %) | (wt %) | (A)/(C) | (C)/(D) |
| Example B-1 | PEG m = 91 | 2.0 | YES25 0.00120 | LG299 0.0010 | 1,667 | 1.20 |
| Example B-2 | PEG m = 227 | 2.0 | YES25 0.00100 | LG299 0.0018 | 2,000 | 0.56 |
| Comparative Example B-1 | PEG m = 45 | 2.0 | YES25 0.00140 | LG299 0.0030 | 1,429 | 0.47 |
| Reference Example B-1 | PEG m = 77 | 2.0 | YES25 0.00140 | LG299 0.0030 | 1,429 | 0.47 |
| Comparative Example B-2 | $Bu(EO)_3$ | 2.0 | YES25 0.00140 | LG299 0.0050 | 1,429 | 0.28 |

*All the addition amounts of components are values in terms of solid content.

TABLE 9

| | Physical properties of concrete | | Shrinkage-reducing performance | |
|---|---|---|---|---|
| | Air content (vol %) | Spacing factor (μm) | Length change ratio (%) in 8th week | Freeze-thaw resistance |
| Example B-1 | 5.0 | 193 | 78.4 | ○ |
| Example B-2 | 5.2 | 144 | 79.2 | ○ |
| Comparative Example B-1 | 5.4 | 355 | 82.3 | x |
| Reference Example B-1 | 4.9 | 261 | 81.2 | x |
| Comparative Example B-2 | 3.1 | 367 | 79.1 | x |

It is found from Table 9 that, in Example B-1 and Example B-2 each using the shrinkage-reducing agent for a hydraulic material of the present invention, an excellent shrinkage-reducing ability is exhibited and excellent freeze-thaw resistance is also exhibited. On the other hand, it is found that, in Comparative Example B-1 and Reference Example B-1, a poor shrinkage-reducing ability is exhibited in comparison to Example B-1 and Example B-2 and very poor freeze-thaw resistance is also exhibited. Further, it is found that, in Comparative Example B-2, very poor freeze-thaw resistance is exhibited in comparison to Example B-1 and Example B-2.

Example C-1 to Example C-3, Reference Example C-1, and Reference Example C-2

Table 10 shows each polyoxyalkylene compound (A), an polyoxyalkyl ether (E), and a polyoxyalkylene alkyl ether serving as an antifoaming agent (D) which were used in Example C-1 to Example C-3, Reference Example C-1, and Reference Example C-2. Table 11 shows the addition amount of each of the components and the blending ratio of the polyoxyalkylene compound (A) to the polyoxyalkyl ether (E). Further, Table 12 shows the results of evaluations for the spacing factor, drying shrinkage-reducing ability, and freeze-thaw resistance of each of mortars produced by using the resultant shrinkage-reducing agents for a hydraulic material. In this case, each of mortars had a paste volume ratio of 41.8%.

TABLE 10

| | Name | |
|---|---|---|
| Polyoxyalkylene compound (A) | PEG4000 | PEG4000 (manufactured by Dai-ichi Kogyo Seiyaku Co., Ltd.) (m = 90) |
| | PEG10000 | PEG10000 (manufactured by Dai-ichi Kogyo Seiyaku Co., Ltd.) (m = 230) |
| Polyoxyalkyl ether (E) | BTG | Ethylene oxide 3-mol adduct of butanol (triethylene glycol mono-n-butyl ether) (manufactured by Wako Pure Chemical Industries, Ltd.) |
| Antifoaming agent (D) Polyoxyalkylene alkyl ether | LG299 | ADEKANOL LG299 (manufactured by ADEKA CORPORATION) (polyoxyalkylene alkyl ether) |

TABLE 11

| | Polyoxyalkylene compound (A) | | Polyoxyalkyl ether (E) | | Antifoaming agent (D) | | |
|---|---|---|---|---|---|---|---|
| | Component | Addition amount (wt %)* | Component | Addition amount (wt %)* | Component | Addition amount (wt %)* | (A)/(E) |
| Example C-1 | PEG10000 | 2.0 | BTG | 2.0 | LG299 | 0.0008 | 50/50 |
| Example C-2 | PEG10000 | 3.0 | BTG | 1.0 | LG299 | 0.0010 | 75/25 |
| Example C-3 | PEG4000 | 2.0 | BTG | 2.0 | LG299 | 0.0008 | 50/50 |
| Reference Example C-1 | PEG10000 | 4.0 | — | — | LG299 | 0.0010 | 100/0 |
| Reference Example C-2 | — | — | BTG | 4.0 | — | — | 0/100 |

*% with respect to cement

*The addition amounts of the polyoxyalkylene compound (A), the polyoxyalkyl ether (E), and the antifoaming agent (D) are values in terms of solid content.

TABLE 12

| | Mortar physical properties | | | | Evaluation for shrinkage-reducing performance | |
|---|---|---|---|---|---|---|
| | Air content (vol %) | Flow value (mm) | Flow value ratio (%) | Spacing factor (μm) | Length change ratio (%) | |
| | | | | | Material age of 4 weeks | Material age of 8 weeks |
| Example C-1 | 4.0 | 153 | 92.7 | 255 | 48.2 | 55.2 |
| Example C-2 | 4.2 | 151 | 91.5 | 248 | 48.6 | 55.9 |
| Example C-3 | 3.9 | 156 | 94.5 | 263 | 51.3 | 55.8 |
| Reference Example C-1 | 4.3 | 134 | 81.2 | 257 | 58.5 | 64.3 |
| Reference Example C-2 | 3.8 | 161 | 97.6 | 324 | 46.7 | 56.2 |

It is found from Table 12 that, in Example C-1 to Example C-3 each using the shrinkage-reducing agent for a hydraulic material of the present invention, an excellent shrinkage-reducing ability is exhibited and the resultant mortar has a small spacing factor, thus indicating that the mortar is excellent in freeze-thaw resistance, and hence these properties are synergistically improved by virtue of the combined use of the polyoxyalkylene compound (A) and the polyoxyalkyl ether (E). Further, it is also found that, the mortar of each of Example C-1 to Example C-3 exhibits a higher flow value ratio in comparison to the case of Reference Example C-1 in which only the polyoxyalkylene compound (A) is used, and hence the viscosity of the mortar is favorably maintained.

On the other hand, it is found that, in Reference Example C-1 using a shrinkage-reducing agent for a hydraulic material including only the polyoxyalkylene compound (A), the resultant mortar has a small spacing factor, thus exhibiting excellent freeze-thaw resistance, but satisfactory shrinkage-reducing performance is not provided. In addition, the mortar of Reference Example C-1 has a smaller flow value ratio in comparison to Example C-1 to Example C-3, and hence has an increased viscosity.

Further, it is found that, in Reference Example C-2 using a shrinkage-reducing agent for a hydraulic material including only the polyoxyalkyl ether (E), the quality of air bubbles introduced is not very good, and consequently, the resultant mortar has a larger spacing factor, thus not being provided with satisfactory freeze-thaw resistance.

Production Example D-1

Synthesis of Copolymer (D-1)

First, 14.66 parts by weight of ion-exchanged water and 49.37 parts by weight of an unsaturated polyalkylene glycol ether monomer (IPN50) obtained by adding an average of 50 moles of ethylene oxide to 3-methyl-3-buten-1-ol were loaded into a reactor made of glass provided with a temperature gauge, a stirring machine, a dropping apparatus, a nitrogen-introducing pipe, and a reflux condenser. Next, the air in the reactor was replaced with nitrogen under stirring, and then the temperature in the reactor was increased to 60° C. under a nitrogen atmosphere. After that, 2.39 parts by weight of a 2% aqueous solution of hydrogen peroxide were added to the mixture. An aqueous solution formed of 3.15 parts by weight of acrylic acid and 0.79 part by weight of ion-exchanged water was dropped to the reactor over 3.0 hours, and an aqueous solution formed of 0.13 part by weight of 3-mercaptopropionic acid, 0.06 part by weight of L-ascorbic acid, and 15.91 parts by weight of ion-exchanged water was dropped to the reactor over 3.5 hours. After that, the temperature was continuously maintained at 60° C. for 1 hour, and was then cooled so that a polymerization reaction was terminated. The pH of the resultant was adjusted to 7.0 with a 48% aqueous solution of sodium hydroxide. Thus, an aqueous solution of a copolymer (D-1) having a weight-average molecular weight of 37,700 was obtained.

Various Components used in Reference Example D-1 to Reference Example D-15

Table 13 shows polyoxyalkylene compounds (A), water-reducing admixture (B), an AE admixture (C), an antifoaming agent (D), and a pH adjuster used in Reference Example D-1 to Reference Example D-15. Further, Table 14 shows the surface tension of a 5 wt % aqueous solution of each of the polyoxyalkylene compounds (A) (in terms of solid content) used in Reference Example D-1 to Reference Example D-15.

TABLE 13

| | Name | |
|---|---|---|
| Polyoxyalkylene compound (A) | A-1 | Polyethylene glycol (having a molecular weight of 200) |
| | A-2 | Polyethylene glycol (having a molecular weight of 600) |
| | A-3 | Polyethylene glycol (having a molecular weight of 1,000) |
| | A-4 | Polyethylene glycol (having a molecular weight of 2,000) |
| | A-5 | Polyethylene glycol (having a molecular weight of 6,000) |
| | A-6 | Polyoxyalkylene glycol-based shrinkage-reducing agent |
| Water-reducing admixture (B) | Copolymer (D-1) | Copolymer (D-1) produced in Production Example D-1 |
| | No. 70 | Pozzolith No. 70 (manufactured by BASF Pozzolith Ltd.) Lignin sulfonic acid-polyol complex |
| AE admixture (C) | AE-2 | Alkyl ether-based anionic surfactant |
| Antifoaming agent (D) | DEF-2 | Polyalkylene glycol ether-based antifoaming agent |

TABLE 14

| Surface tension of 5 wt % aqueous solution (in terms of solid content) (mN/m) | |
|---|---|
| A-1 | 66.8 |
| A-2 | 63.6 |
| A-3 | 63.1 |
| A-4 | 62.3 |
| A-5 | 61.8 |
| A-6 | 33.4 | pH Adjuster/Polyoxyalkylene Compound (A) Compositions Used in Reference Example D-1 to Reference Example D-15

Table 15 shows the pH adjuster/polyoxyalkylene compound (A) compositions used in Reference Example D-1 to Reference Example D-15.

TABLE 15

| pH adjuster/polyoxyalkylene compound (A) composition | Composition and composition ratio | |
|---|---|---|
| P-1 | pH adjuster | Sodium acetate |
| | Polyoxyalkylene compound (A) | A-1 |
| | pH adjuster/polyoxyalkylene compound (A) | 1/1,400 |
| P-2 | pH adjuster | Sodium phosphate |
| | Polyoxyalkylene compound (A) | A-2 |
| | pH adjuster/polyoxyalkylene compound (A) | 1/1,000 |
| P-3 | pH adjuster | Potassium phosphate |
| | Polyoxyalkylene compound (A) | A-3 |
| | pH adjuster/polyoxyalkylene compound (A) | 1/670 |

TABLE 15-continued

| pH adjuster/polyoxyalkylene compound (A) composition | Composition and composition ratio | |
|---|---|---|
| P-4 | pH adjuster | Potassium acetate |
| | Polyoxyalkylene compound (A) | A-4 |
| | pH adjuster/polyoxyalkylene compound (A) | 1/1,300 |
| P-5 | pH adjuster | Sodium phosphate |
| | Polyoxyalkylene compound (A) | A-5 |
| | pH adjuster/polyoxyalkylene compound (A) | 1/2,000 |

Reference Example D-1 to Reference Example D-5

A mortar was prepared by adding each of the pH adjuster/polyoxyalkylene compound compositions (P-2) to (P-5) and the polyoxyalkylene compound (A-6) at 2% with respect to the amount of cement. Table 16 shows the measurement result of the autogeneous-shrinkage strain of the mortar. It was difficult for the antifoaming agent (D) to control the air content of the mortar prepared by adding the polyoxyalkylene compound (A-6) having a surface tension of 33 mN/m, and hence the mortar had an air content of 10% or more. Thus, the autogeneous-shrinkage strain of the mortar was not measurable. The mortar prepared by adding each of the pH adjuster/polyoxyalkylene compound compositions (P-2) to (P-5) exhibited a length change ratio of 77 to 82 at a material age of days, showing that the mortar has good autogeneous-shrinkage-reducing property. It is found from these results that the pH adjuster/polyoxyalkylene compound compositions (P-2) to (P-5) are capable of easily adjusting the air content of the resultant mortars and the mortars are excellent in autogeneous-shrinkage-reducing property.

TABLE 16

| | Blending ratio in mortar (solid content/cement content at wt %) | | | | |
|---|---|---|---|---|---|
| | pH adjuster/ polyoxyalkylene compound (A) composition or polyoxyalkylene compound (A) | | Addition amount of antifoaming agent (D) | Water-reducing admixture (B) | |
| | Kind | Addition amount | | Kind | Addition amount |
| Reference Example D-1 | P-2 | 2.0 | 0.00053 | Copolymer (D-1) | 0.10 |
| Reference Example D-2 | P-3 | 2.0 | 0.00053 | | 0.12 |
| Reference Example D-3 | P-4 | 2.0 | 0.00061 | | 0.12 |
| Reference Example D-4 | P-5 | 2.0 | 0.00068 | | 0.14 |
| Reference Example D-5 | A-6 | 2.0 | 0.00200 | | 0.12 |
| Standard | — | | 0.00017 | | 0.11 |

TABLE 16-continued

| | Mortar physical properties | | Autogeneous-shrinkage-reducing ability (material age of 7 days) | |
|---|---|---|---|---|
| | Flow (mm) | Air content (vol %) | Shrinkage strain (×10$^{-6}$) | Length change ratio (%) |
| Reference Example D-1 | 195 | 2.8 | 527 | 82 |
| Reference Example D-2 | 190 | 2.9 | 496 | 77 |
| Reference Example D-3 | 190 | 2.9 | 513 | 80 |
| Reference Example D-4 | 205 | 3.2 | 505 | 79 |
| Reference Example D-5 | — | 10.4 | Unmeasurable because of excessive air content | |
| Standard | 195 | 3.0 | 641 | — |

Reference Example D-6 to Reference Example D-8

A mortar was prepared by adding each of the pH adjuster/polyoxyalkylene compound compositions (P-4) and (P-5) at 2 wt % in terms of solid content with respect to the amount of cement. Table 17 shows the blending ratio of admixtures in the mortar and the shrinkage-reducing ability and weight reduction ratio of the mortar at a material age of 7 days. The mortar specimens exhibit length change ratios of 74 and 72, respectively, and hence it is found that these pH adjuster/polyoxyalkylene compound compositions each have a good drying shrinkage-reducing ability. Further, the mass reduction ratio of those mortar specimens is small in comparison to that of the mortar specimen of Reference Example D-8, and hence it is found that the addition of any of these pH adjuster/polyoxyalkylene compound compositions contributes to suppressing the evaporation of water from the mortar specimens. It is found from these results that the pH adjuster/polyoxyalkylene compound compositions (P-4) and (P-5) exert excellent effects of reducing water evaporation from the resultant specimens and reducing the shrinkage of the specimens.

TABLE 17

| | Blending ratio in mortar (solid content/cement content at wt %) | | |
|---|---|---|---|
| | pH adjuster/polyoxyalkylene compound (A) composition | | Addition amount of antifoaming agent (D) |
| | Kind | Addition amount | |
| Reference Example D-6 | P-4 | 2.0 | 0.00053 |
| Reference Example D-7 | P-5 | 2.0 | 0.00053 |
| Reference Example D-8 | — | — | — |

| | Autogeneous-shrinkage-reducing ability (material age of 7 days) | | | |
|---|---|---|---|---|
| | Air content (vol %) | Shrinkage strain (×10$^{-6}$) | Length change ratio (%) | Weight reduction ratio (%) |
| Reference Example D-6 | 4.0 | 460 | 74 | 3.37 |

TABLE 17-continued

| | | | | |
|---|---|---|---|---|
| Reference Example D-7 | 3.9 | 445 | 72 | 3.15 |
| Reference Example D-8 | 4.4 | 620 | — | 3.49 |

Reference Example D-9 to Reference Example D-15

Blending

The respective materials were weighed according to the blending ratios shown in Table 18 so that a mixing volume was 30 L, and then the materials were mixed with a pan mixer. It should be noted that cement used was a mixture of equal amounts of normal Portland cement (each having a specific gravity of 3.16) manufactured by Taiheiyo Cement Corporation, Sumitomo Osaka Cement Co., Ltd., and UBE-MITSUBISHI CEMENT CORPORATION. A mixture produced by mixing land sand collected in Kakegawa and land sand collected in Kimitsu at a weight ratio of land sand collected in Kakegawa/land sand collected in Kimitsu=80/20 was used as a fine aggregate. A hard sandstone collected in Ome was used as a coarse aggregate.

TABLE 18

| Water cement ratio (W/C) | Ratio of fine aggregate (s/a) | Unit content (kg/m³) | | | |
|---|---|---|---|---|---|
| | | Cement | Water and shrinkage-reducing admixture | Fine aggregate | Coarse aggregate |
| 53% | 48 | 320 | 170 | 837 | 942 |

(Mixing of Materials)

The coarse aggregate and a half amount of the fine aggregates to be used were loaded into a mixer, and then the contents were subjected to dry mixing for 5 seconds. After that, rotation was stopped, and then the cement and the remaining fine aggregates were loaded. After the contents had been subjected to dry mixing for an additional 5 seconds, the rotation was stopped again, and then water containing the polyoxyalkylene compound (A), the water-reducing admixture (B), the AE admixture (C), the antifoaming agent (D), the pH adjuster, and the like was added to the mixture. After the contents had been mixed for 90 seconds, the concrete was taken out of the mixer. It should be noted that, when the materials were mixed, the addition amounts of the water-reducing admixture (B), the AE admixture (C), the antifoaming agent (D), and the like were adjusted so that the slump value of the fresh concrete and its air content were 15±1.5 cm and 5±1%, respectively.

(Evaluations)

Table 19 and Table 20 show the physical properties, shrinkage-reducing ability (length change), and freeze-thaw resistance (durability factor) of a concrete produced by using each of the pH adjuster/polyoxyalkylene compound compositions (P-1) to (P-5), the blending ratio of admixtures, and evaluation results. The concrete prepared by adding each of the pH adjuster/polyoxyalkylene compound compositions at 2 to 4 mass % in terms of solid content with respect to the amount of cement exhibits a length change ratio of 46 to 77 at a dried material age of 8 weeks, and hence it is found that the pH adjuster/polyoxyalkylene compound compositions also provide excellent shrinkage-reducing ability to concretes as is the case with the mortars. The concrete of Reference Example D-15 including the pH adjuster/polyoxyalkylene compound composition (P-1) using A-1 whose 5% aqueous solution has a surface tension of 66.8 has a durability factor of 13, and hence it is found that the concrete has remarkably reduced freeze-thaw resistance. The concrete of each of Reference Example D-9 to Reference Example D-14 other than Reference Example D-15 exhibits a durability factor of 70 or more, and hence it is found that high freeze-thaw resistance can be accomplished by adjusting the amount of entrained air with the AE admixture (C) or the antifoaming agent (D).

TABLE 19

| | Addition amounts of admixtures (solid content/cement content at wt %) | | | | |
|---|---|---|---|---|---|
| | pH adjuster/ polyoxyalkylene compound (A) composition | | Antifoaming agent (D) (DEF-2) | Water-reducing admixture (B) (No. 70) | AE admixture (C) (AE-2) |
| | Kind | Addition amount | | | |
| Reference Example D-9 | P-2 | 3.0 | 0.00210 | 0.12 | 0.0010 |
| Reference Example D-10 | P-3 | 3.0 | 0.00210 | 0.12 | 0.0010 |
| Reference Example D-11 | P-4 | 3.0 | 0.00210 | 0.12 | 0.0010 |
| Reference Example D-12 | P-5 | 2.0 | 0.00100 | 0.12 | 0.0010 |
| Reference Example D-13 | P-5 | 4.0 | 0.00060 | 0.12 | 0.0010 |
| Reference Example D-14 | — | — | — | 0.12 | 0.0010 |
| Reference Example D-15 | P-1 | 3.0 | 0.00210 | 0.12 | 0.0010 |

TABLE 20

| | Addition amounts of admixtures (solid content/cement content at wt %) pH adjuster/polyoxyalkylene compound (A) composition | | Concrete physical properties | | | |
|---|---|---|---|---|---|---|
| | Kind | Addition amount | Slump (cm) | Air content (vol %) | Durability factor | Length change ratio (material age of 8 weeks) |
| Reference Example D-9 | P-2 | 3.0 | 14.0 | 5.2 | 78 | 77 |
| Reference Example D-10 | P-3 | 3.0 | 15.5 | 5.5 | 74 | 73 |
| Reference Example D-11 | P-4 | 3.0 | 15.5 | 4.8 | 80 | 71 |

TABLE 20-continued

| | Addition amounts of admixtures (solid content/cement content at wt %) pH adjuster/polyoxyalkylene compound (A) composition | | Concrete physical properties | | | |
|---|---|---|---|---|---|---|
| | Kind | Addition amount | Slump (cm) | Air content (vol %) | Durability factor | Length change ratio (material age of 8 weeks) |
| Reference Example D-12 | P-5 | 2.0 | 15.0 | 5.0 | 88 | 73 |
| Reference Example D-13 | P-5 | 4.0 | 15.0 | 5.0 | 76 | 46 |
| Reference Example D-14 | — | | 16.0 | 5.1 | 80 | 100 |
| Reference Example D-15 | P-1 | 3.0 | 14.0 | 4.9 | 13 | 77 |

INDUSTRIAL APPLICABILITY

According to the present invention, it is possible to provide the shrinkage-reducing agent for a hydraulic material, which does not require a combination with any other admixture, is inexpensive, and is capable of suppressing a reduction in strength of a hardened concrete material, suppressing generation of a crack in a hardened concrete material by virtue of its excellent shrinkage-reducing ability, and imparting excellent freeze-thaw resistance.

The invention claimed is:

1. A shrinkage-reducing agent for a hydraulic material, comprising at least one kind of polyoxyalkylene compound (A), which is a compound selected from the group consisting of (i) polyalkyleneglycols, (ii) oxyethylene adducts of lower alcohols and higher alcohols each having 8 or more carbon atoms, and (iii) adducts of two or more kinds of oxyalkylenes essentially including an oxyethylene of lower alcohols and higher alcohols each having 8 or more carbon atoms, as an essential component, wherein a concrete or a mortar produced by using the shrinkage-reducing agent for a hydraulic material has a spacing factor of 350 μm or less,
further comprising a water-reducing admixture (B); and
an air entraining admixture (C) and an antifoaming agent (D), wherein a content ratio of the air entraining admixture (C) to the antifoaming agent (D), the air entraining admixture (C)/the antifoaming agent (D), is 99/1 to 5/95 as a weight ratio in terms of solid content,
wherein the water-reducing admixture (B) is at least one kind of compound selected from the group consisting of a lignin sulfonate, a naphthalene sulfonic acid-formalin condensate, and a polymer having a polyoxyalkylene group and an anionic group,
wherein the air entraining admixture (C) is at least one kind of compound selected from the group consisting of resin soaps, saturated or unsaturated fatty acids, sodium hydroxystearate, lauryl sulfate, alkylbenzenesulfonates, linear alkylbenzenesulfonates, alkanesulfonates, polyoxyethylene alkyl (phenyl) ethers, polyoxyethylene alkyl (phenyl) ether sulfuric acid esters or salts thereof, polyoxyethylene alkyl (phenyl) ether phosphoric acid esters or salts thereof, proteinic materials, alkenylsulfosuccinates, and α-olefin sulfonates,
wherein the antifoaming agent (D) is at least one kind of compound selected from the group consisting of mineral oil-based antifoaming agents, fat and oil-based antifoaming agents, fatty acid-based antifoaming agents, fatty acid ester-based antifoaming agents, oxyalkylene-based antifoaming agents, alcohol-based antifoaming agents, amide-based antifoaming agents, phosphoric acid ester-based antifoaming agents, and metal soap-based antifoaming agents,
and wherein the ratio of the total amount of the polyoxyalkylene compound (A) and the water-reducing admixture (B) to the total amount of the entraining admixture (C) and the antifoaming agent (D) is 99.99/0.01 to 98/2 as a weight ratio in terms of solid content.

2. A shrinkage-reducing agent for a hydraulic material according to claim 1, wherein the polyoxyalkylene compound (A) has a weight-average molecular weight of more than 4,000.

3. A shrinkage-reducing agent for a hydraulic material according to claim 1, wherein the polyoxyalkylene compound (A) is represented by the following general formula (1):

$$RO\text{-}(AO)_n\text{—}H \quad (1)$$

in the general formula (1): R represents a hydrogen atom or a hydrocarbon group having 1 to 30 carbon atoms; AO represents an oxyalkylene group having 2 to 18 carbon atoms; and n represents an average added mole number of the oxyalkylene groups and n represents 80 to 1,000.

4. A shrinkage-reducing agent for a hydraulic material according to claim 1, wherein the oxyalkylene groups included in the polyoxyalkylene compound (A) comprise 50 mol % or more of oxyethylene groups.

5. A shrinkage-reducing agent for a hydraulic material according to claim 1, wherein the polyoxyalkylene compound (A) is represented by the following general formula (2):

$$R^1\text{—}O\text{-}(EO)_m\text{—}H \quad (2)$$

in the general formula (2): Fe represents a hydrogen atom or a hydrocarbon group having 1 to 4 carbon atoms; EO represents an oxyethylene group; and m represents an average added mole number of EO's and m represents 80 to 1,000.

6. A shrinkage-reducing agent for a hydraulic material according to claim 1, wherein the air entraining admixture (C) comprises a polyoxyethylene alkyl ether sulfate and a content ratio of the polyoxyalkylene compound (A) to the air entraining admixture (C) is (A)/(C)=400 to 4,000 as a weight ratio.

7. A shrinkage-reducing agent for a hydraulic material according to claim 1, further comprising a polyoxyalkyl ether (E) represented by the following general formula (3):

$$R^2\text{—}O\text{-}(AO)_p\text{—}R^3 \quad (3)$$

in the general formula (3): $R^2$ represents a hydrocarbon group having 1 to 8 carbon atoms; $R^3$ represents a hydrogen atom or a hydrocarbon group having 1 to 8 carbon atoms; AO represents an oxyalkylene group having 2 to 4 carbon atoms; and p represents an average added mole number of AO's and p represents 2 to 30, wherein a content ratio of the polyoxyalkylene compound (A) to the polyoxyalkyl ether (E) is (A)/(E)=50/50 to 90/10 as a weight ratio.

8. A shrinkage-reducing agent for a hydraulic material according to claim 2, wherein the oxyalkylene groups included in the polyoxyalkylene compound (A) comprise 50 mol % or more of oxyethylene groups.

9. A shrinkage-reducing agent for a hydraulic material according to claim 4, wherein the air entraining admixture (C) comprises a polyoxyethylene alkyl ether sulfate and a content ratio of the polyoxyalkylene compound (A) to the air entraining admixture (C) is (A)/(C)=400 to 4,000 as a weight ratio.

10. A shrinkage-reducing agent for a hydraulic material according to claim 1, wherein the content ratio of the polyoxyalkylene compound (A) to the water-reducing admixture (B) is 99.9/0.1 to 80/20 as a weight ratio in terms of solid content.

11. A shrinkage-reducing agent for a hydraulic material according to claim 1, further comprising a pH adjuster.

\* \* \* \* \*

UNITED STATES PATENT AND TRADEMARK OFFICE
CERTIFICATE OF CORRECTION

| | |
|---|---|
| PATENT NO. | : 8,933,151 B2 |
| APPLICATION NO. | : 13/520986 |
| DATED | : January 13, 2015 |
| INVENTOR(S) | : Mari Masanaga and Koji Fukuhara |

It is certified that error appears in the above-identified patent and that said Letters Patent is hereby corrected as shown below:

In the Claims

In Claim 5 at column 40, line 51:

Delete "in general formula (2): Fe represents a hydrogen atom" and insert -- in general formula (2): $R^1$ represents a hydrogen atom --

Signed and Sealed this
Nineteenth Day of May, 2015

Michelle K. Lee
*Director of the United States Patent and Trademark Office*